(12) United States Patent
Park et al.

(10) Patent No.: US 11,825,489 B2
(45) Date of Patent: Nov. 21, 2023

(54) METHOD AND APPARATUS FOR CONFIGURING RESOURCES AND TRANSMITTING/RECEIVING DATA IN WIRELESS CELLULAR COMMUNICATION SYSTEM

(71) Applicant: Samsung Electronics Co., Ltd., Gyeonggi-do (KR)

(72) Inventors: Sungjin Park, Incheon (KR); Jinyoung Oh, Seoul (KR); Jeongho Yeo, Gyeonggi-do (KR); Heedon Gha, Gyeonggi-do (KR); Taehan Bae, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/358,915

(22) Filed: Jun. 25, 2021

(65) Prior Publication Data

US 2021/0329686 A1   Oct. 21, 2021

Related U.S. Application Data

(63) Continuation of application No. 16/148,476, filed on Oct. 1, 2018, now Pat. No. 11,432,316.

(30) Foreign Application Priority Data

Sep. 29, 2017  (KR) .......................... 10-2017-0127659

(51) Int. Cl.
  *H04W 72/23*  (2023.01)
  *H04W 72/0453*  (2023.01)
(52) U.S. Cl.
  CPC ........ *H04W 72/23* (2023.01); *H04W 72/0453* (2013.01)

(58) Field of Classification Search
  None
  See application file for complete search history.

(56) References Cited

U.S. PATENT DOCUMENTS

| | | |
|---|---|---|
| 9,930,665 B2 | 3/2018 | Papasakellariou et al. |
| 2012/0182950 A1 | 7/2012 | Chung et al. |
| | (Continued) | |

FOREIGN PATENT DOCUMENTS

| | | |
|---|---|---|
| CN | 103875187 | 6/2014 |
| CN | 105101283 | 11/2015 |
| | (Continued) | |

OTHER PUBLICATIONS

Vivo, "Remaining Details for Bandwidth Part Operation", R1-1715648, 3GPP TSG RAN WG1 NR AH#3, Sep. 18-21, 2017, 3 pages.

(Continued)

*Primary Examiner* — Adnan Baig
(74) *Attorney, Agent, or Firm* — The Farrell Law Firm, P.C.

(57) ABSTRACT

Methods and apparatuses in a wireless communication system is provided. Configuration information for defining a downlink assignment for a bandwidth part (BWP) is transmitted to a user equipment (UE) by higher layer signaling. At least one BWP is configured in a cell of the base station and the higher layer signaling is UE specific. An activated BWP is identified. Downlink control information (DCI) is transmitted on the activated BWP. Data is transmitted to the UE on the activated BWP according to the downlink assignment for the activated BWP. The downlink assignment is defined on the activated BWP, based on both the configuration information by the higher layer signaling and remaining information by the DCI.

12 Claims, 20 Drawing Sheets

(56) References Cited

U.S. PATENT DOCUMENTS

| | | | |
|---|---|---|---|
| 2012/0307869 A1 | 12/2012 | Charbit et al. | |
| 2013/0188590 A1* | 7/2013 | Aiba | H04L 1/1861 370/329 |
| 2015/0156763 A1 | 6/2015 | Seo et al. | |
| 2016/0014778 A1 | 1/2016 | Zhou et al. | |
| 2016/0353478 A1* | 12/2016 | Kim | H04W 56/002 |
| 2017/0085326 A1 | 3/2017 | Li et al. | |
| 2017/0347270 A1 | 11/2017 | Iouchi et al. | |
| 2018/0098361 A1 | 4/2018 | Ji | |
| 2018/0124753 A1* | 5/2018 | Sun | H04L 1/0088 |
| 2018/0288746 A1 | 10/2018 | Zhang | |
| 2019/0052329 A1 | 2/2019 | Aiba | |
| 2019/0053235 A1 | 2/2019 | Novlan | |
| 2019/0077508 A1* | 3/2019 | Shimezawa | H04B 17/24 |
| 2019/0327761 A1 | 10/2019 | Suzuki et al. | |
| 2020/0178353 A1 | 6/2020 | Yang | |
| 2020/0221325 A1 | 7/2020 | Zheng | |
| 2020/0252180 A1* | 8/2020 | Takeda | H04W 72/12 |
| 2020/0305094 A1* | 9/2020 | Ouchi | H04W 52/325 |
| 2020/0305138 A1 | 9/2020 | Li et al. | |
| 2020/0336987 A1* | 10/2020 | Mukherjee | H04W 16/14 |
| 2021/0067194 A1 | 3/2021 | Takeda et al. | |

FOREIGN PATENT DOCUMENTS

| | | |
|---|---|---|
| CN | 107148789 | 9/2017 |
| JP | 5519761 | 6/2014 |
| KR | 1020150023363 | 3/2015 |

OTHER PUBLICATIONS

Huawei, HiSilicon, "Discussion on UL Multiplexing of eMBB and URLLC", R1-1715421, 3GPP TSG RAN WG1 Ad Hoc Meeting, Sep. 18-21, 2017, 8 pages.

Huawei, HiSilicon, "On Multiple Resource Configuration for UL Grant-free Transmission", R1-1715420, 3GPP TSG RAN WG1 NR Ad-Hoc #3, Sep. 18-21, 2017, 9 pages.

OPPO, "SPS Operations for BWP Switching", R2-1710134, 3GPP TSG RAN WG2 #99-Bis, Oct. 9-13, 2017, 3 pages.

International Search Report dated Feb. 13, 2019 issued in counterpart application No. PCT/KR2018/011654, 3 pages.

Guangdong OPPO Mobile Telecom, "Remaining Issues on Bandwidth Part Configuration and Activation", R1-1715692, 3GPP TSG RAN WG1 Meeting NR#3, Sep. 18-21, 2017, 4 pages.

European Search Report dated Aug. 6, 2020 issued in counterpart application No. 1886077.7-1215, 8 pages.

Samsung, "Impact of Bandwidth Parts on SPS Scheduling", R2-1711289, 3GPP TSG-RAN WG2#99bis Meeting, Oct. 9-13, 2017, 4 pages.

Korean Office Action dated Apr. 28, 2022 issued in counterpart application No. 10-2017-0127659, 8 pages.

U.S. Office Action dated Jan. 21, 2022 issued in counterpart U.S. Appl. No. 16/148,476, 59 pages.

Indian Examination Report dated Mar. 25, 2022 issued in counterpart application No. 202037012901, 6 pages.

U.S. Office Action dated Sep. 21, 2021 issued in counterpart U.S. Appl. No. 16/148,476, 50 pages.

U.S. Notice of Allowance dated Jul. 13, 2022 issued in counterpart U.S. Appl. No. 16/148,476, 12 pages.

CATT, "Grant-based and Grant-free UL Transmission Procedures", R1-1715827, 3GPP TSG RAN WG1 Meeting NR#3, Sep. 18-21, 2017, 4 pages.

Chinese Office Action dated Feb. 14, 2023 issued in counterpart application No. 201880063787.2, 25 pages.

Ericsson, "SPS for SCell", R2-1711252, 3GPP TSG-RAN WG2 #99bis, Oct. 9-13, 2017, 2 pages.

Korean Office Action dated Oct. 19, 2022 issued in counterpart application No. 10-2017-0127659, 9 pages.

Korean Office Action dated Jul. 19, 2023 issued in counterpart application No. 10-2023-0072727, 9 pages.

Chinese Office Action dated Aug. 23, 2023 issued in counterpart application No. 201880063787.2, 14 pages.

* cited by examiner

FIG. 4
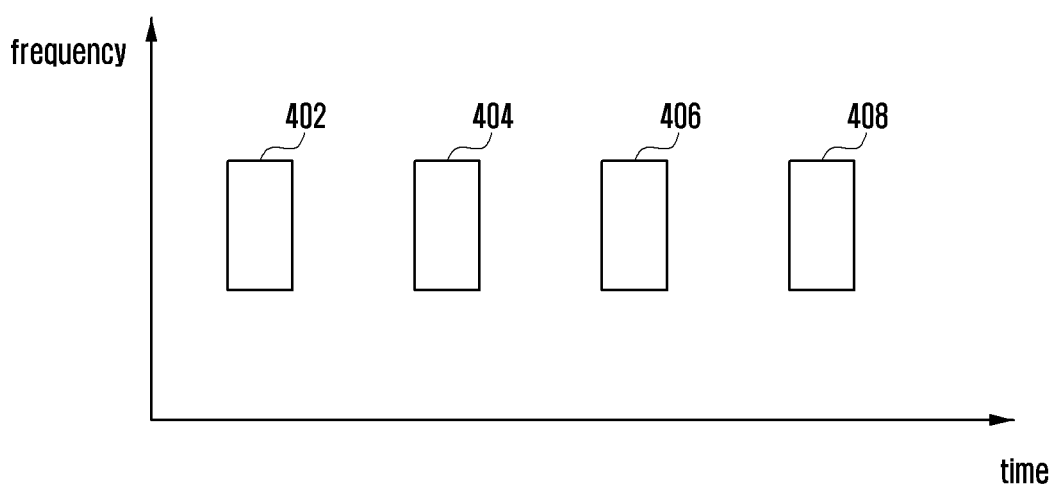
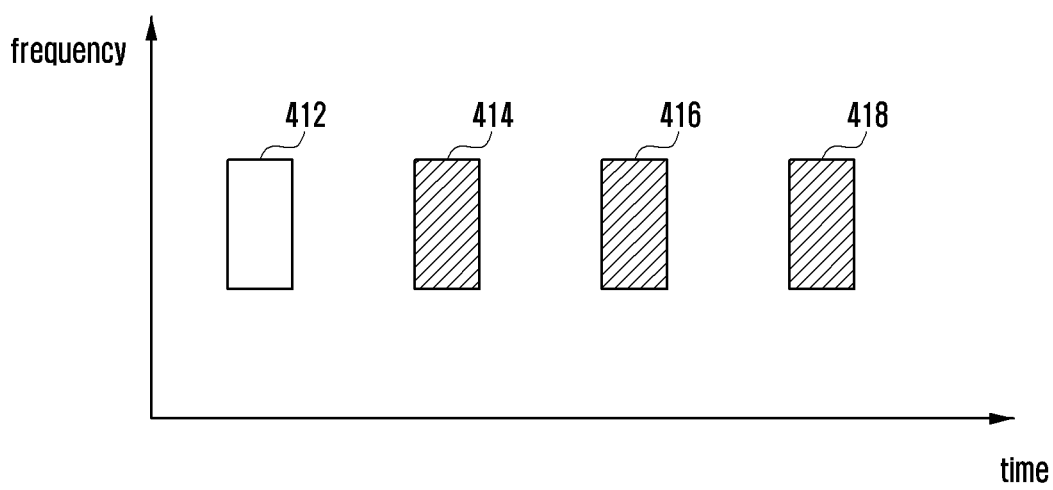

FIG. 18
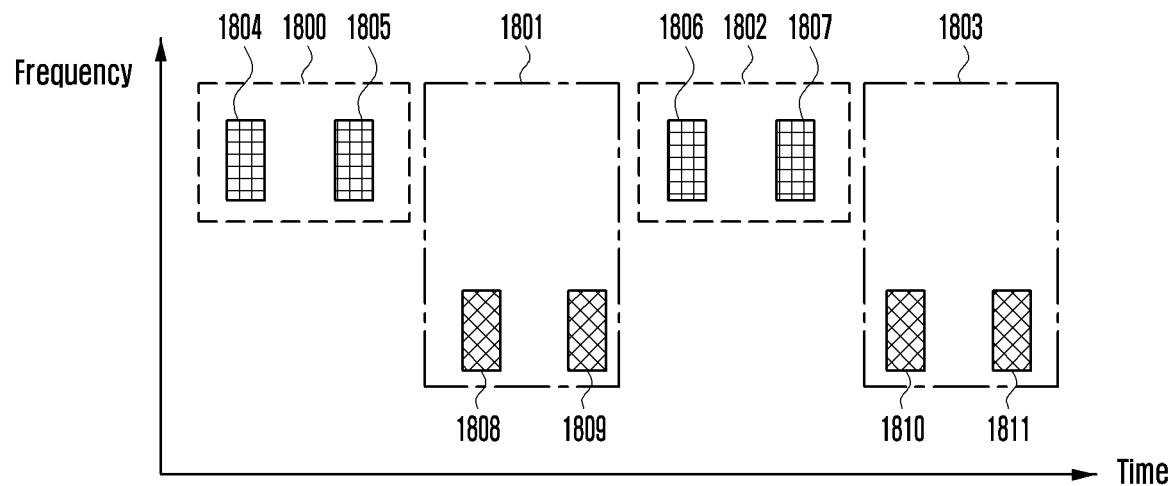
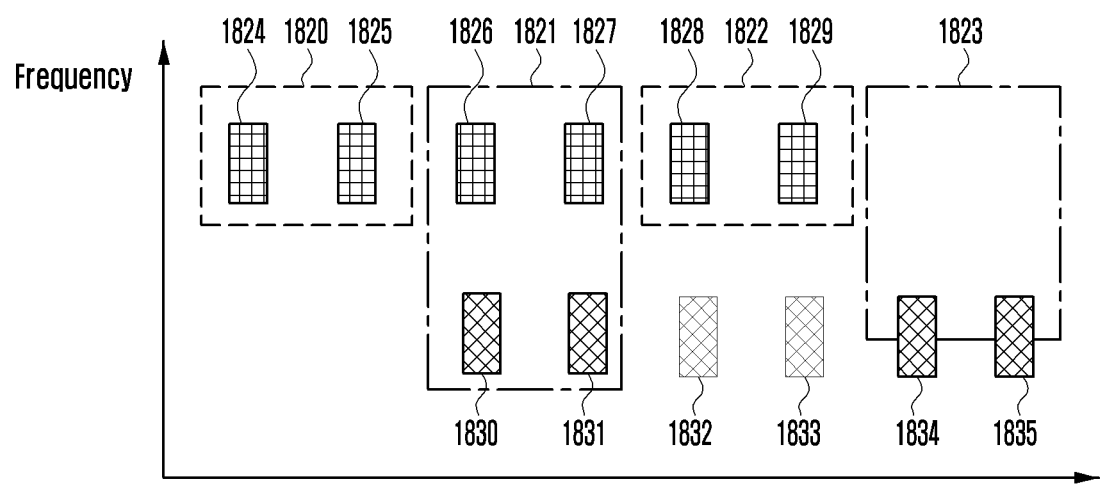
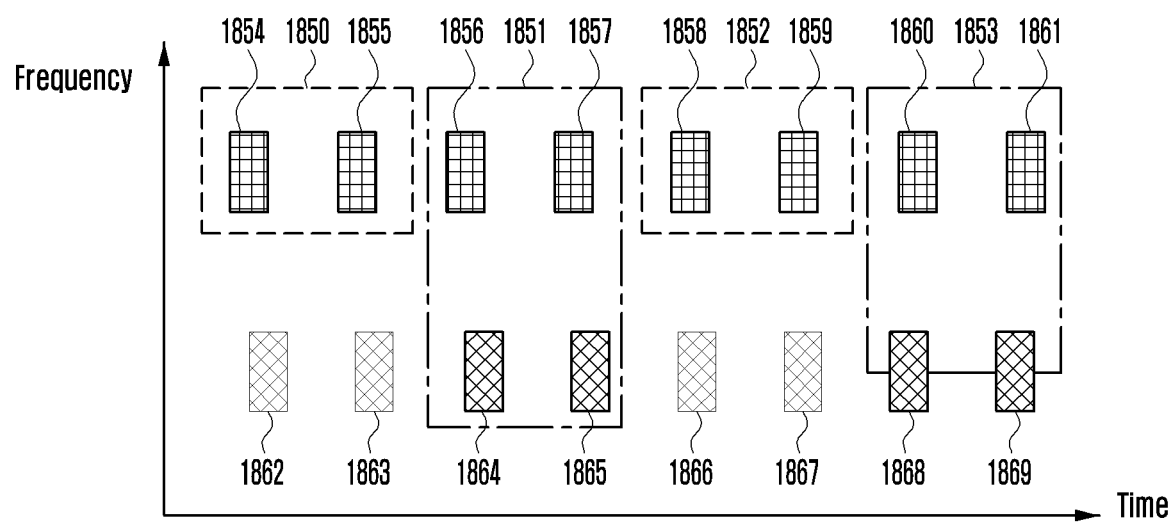

METHOD AND APPARATUS FOR CONFIGURING RESOURCES AND TRANSMITTING/RECEIVING DATA IN WIRELESS CELLULAR COMMUNICATION SYSTEM

CROSS-REFERENCE TO RELATED APPLICATION(S)

This application is a Continuation Application of U.S. patent application Ser. No. 16/148,476, filed in the U.S. Patent and Trademark Office on Oct. 1, 2018, which is based on and claims priority under 35 U.S.C. § 119 to Korean Patent Application Serial No. 10-2017-0127659, filed on Sep. 29, 2017, in the Korean Intellectual Property Office, the entire disclosure of each of which is incorporated herein by reference.

BACKGROUND

1. Field

The present disclosure relates generally to a wireless communication system, and more particularly, to a method and apparatus for facilitating service provision in the wireless communication system.

2. Description of Related Art

To meet the increased demand for wireless data traffic since deployment of 4G communication systems, efforts have been made to develop an improved 5G or pre-5G communication system. The 5G or pre-5G communication system is also called a "beyond 4G network" or a "post long term evolution (LTE) system". Implementation of the 5G communication system in higher frequency (mmWave) bands (e.g., 60 GHz bands) is being considered in order to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, hybrid FSK and QAM modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet is now evolving into the Internet of things (IoT) where distributed entities, such as things, exchange and process information without human intervention. The Internet of everything (IoE), which is a combination of IoT technology and big data processing technology through connection with a cloud server, has emerged, As technology elements such as "sensing technology", "wired/wireless communication and network infrastructure", "service interface technology", and "security technology" have been demanded for IoT implementation, there has been recent research into a sensor network, machine-to-machine (M2M) communication, machine type communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected cars, smart grid, health care, smart appliances, and advanced medical services through convergence and combination between existing information technology (IT) and various industrial applications.

In line with these developments, various attempts have been made to apply the 5G communication system to IoT networks. Technologies such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

The 5G communication system may provide a terminal with at least one of three types of services: enhanced mobile broadband (eMBB), massive machine type communications (mMTC), and ultra-reliable and low-latency communications (URLLC).

In line with the evolvement of the LTE and LTE-advanced (LTE-A), there is a need of a method and apparatus for facilitating service provision in the LTE and 5G/new radio or next radio (NR) wireless communication systems.

There is a need of a method and apparatus for facilitating coexistence between eMBB and URLLC services or between mMTC and URLLC services in the 5G/NR communication system evolved from LTE.

SUMMARY

The present disclosure has been made to address at least the disadvantages described above and to provide at least the advantages described below.

Aspects of the present disclosure provide a method and apparatus for data communication based on semi-persistent scheduling (SPS) or grant-free resource configuration information, provide a method and apparatus for data communication using grant-free resources configured per bandwidth part (BWP), and provide a method and apparatus for data communication using grant-free resources configured per bandwidth part in a system supporting bandwidth part switching.

In accordance with an aspect of the present disclosure, a method performed by a base station in a wireless communication system is provided. The method includes transmitting, to a user equipment (UE), configuration information for defining a downlink assignment for a bandwidth part (BWP) by higher layer signaling. At least one BWP is configured in a cell of the base station and the higher layer signaling is UE specific. An activated BWP is identified. Downlink control information (DCI) is transmitted on the activated BWP. Data is transmitted to the UE on the activated BWP according to the downlink assignment for the activated BWP. The downlink assignment is defined on the activated BWP, based on both the configuration information by the higher layer signaling and remaining information by the DCI.

In accordance with an aspect of the present disclosure, a method performed by a UE in a wireless communication system is provided. The method includes receiving, from a base station, configuration information for defining a downlink assignment for a BWP by a higher layer signaling. At least one BWP is configured in a cell of the base station and the higher layer signaling is UE specific. An activated BWP is identified. DCI is received on the activated BWP. Data is received from the base station on the activated BWP according to the downlink assignment for the activated BWP. The downlink assignment is defined on the activated BWP, based on both the configuration information by the higher layer signaling and remaining information by the DCI.

In accordance with an aspect of the present disclosure, a base station in a wireless communication system is provided. The base station includes a transceiver and a controller. The controller is configured to transmit, to a UE, configuration information for defining a downlink assignment for a BWP by a higher layer signaling. At least one BWP is configured in a cell of the base station and the higher layer signaling is UE specific. An activated BWP is identified. DCI is transmitted on the activated BWP. Data is transmitted to the UE on the activated BWP according to the downlink assignment for the activated BWP. The downlink assignment is defined on the activated BWP, based on both the configuration information by the higher layer signaling and remaining information by the DCI.

In accordance with an aspect of the present disclosure, a UE in a wireless communication system is provided The UE includes a transceiver and a controller. The controller is configured to receive, from a base station, configuration information for defining a downlink assignment for a BWP by a higher layer signaling. At least one BWP is configured in a cell of the base station and the higher layer signaling is UE specific. An activated BWP is identified. DCI is received on the activated BWP. Data is received from the base station on the activated BWP according to the downlink assignment for the activated BWP. The downlink assignment is defined on the activated BWP, based on both the configuration information by the higher layer signaling and remaining information by the DCI.

BRIEF DESCRIPTION OF THE DRAWINGS

The above and other aspects, features and advantages of certain embodiments of the disclosure will be more apparent from the following detailed description taken in conjunction with the accompanying drawings, in which

FIG. 4 is a diagram of an SPS or grant-free resources configuration and data transmission/reception method of a terminal, according to an embodiment;

FIG. 18 is a diagram of a method for configuring grant-free or SPS resources in adaptation to BWP configuration, according to an embodiment;

DETAILED DESCRIPTION

Figure 1:
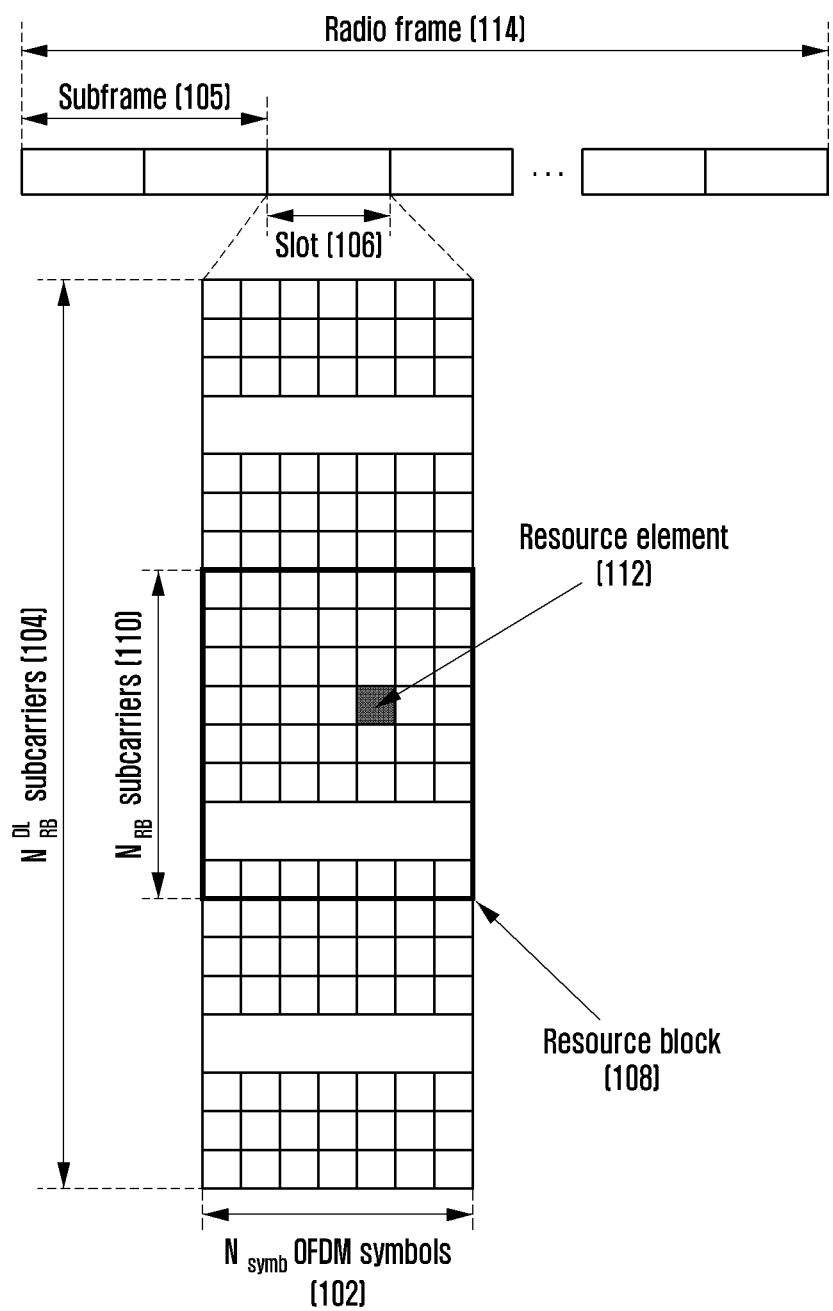
FIG. 1 is a diagram of a basic time-frequency resource structured for transmitting downlink data or control channel in an LTE or LTE-A system.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," " adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context, For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

The mobile communication system has evolved to a high-speed, high-quality packet data communication system (such as high speed packet access (HSPA), LTE (or evolved universal terrestrial radio access (E-UTRA)), and LTE-Advanced (LTE-A) defined in $3^{rd}$ Generation Partnership Project (3GPP), high rate packet data (HRPD) defined in $3^{rd}$ Generation Partnership Project-2 (3GPP2), and 802.16e defined in IEEE) capable of providing data and multimedia services beyond the early voice-oriented services. Many 5G or NR technologies are under standardization for 5G wireless communication systems.

The wireless communication systems including the 5G communication system may provide a UE with at least one of eMBB, mMTC, and URLLC services. The above services may be provided a terminal simultaneously during a time period. The eMBB services have requirements of high-speed transmission of large volume of data, the eMTC services have requirements of low power and multiple-terminal accesses, and the URLLC services have requirements of ultra-high reliability and low latency. However, they are not limited thereby. These three types of services are mainly associated with scenarios in the beyond LTE/LTE-A and 5G/NR systems. Coexistences between the eMBB and URLLC and between the mMTC and URLLC and devices for supporting the coexistences are provided herein.

When URLLC service data is to be transmitted in a transmission time interval (TTI) in which the base station has scheduled a certain terminal for eMBB service data, the base station may transmit the URLLC service data in part of the frequency band in which the eMBB service data transmission is scheduled. The terminal scheduled for the eMBB service and the terminal scheduled for URLLC service may be identical with or different from each other. Part of the scheduled eMBB data are not transmitted such that the eMBB data are likely to be damaged. Thus, there is a need of a method for the terminal scheduled for the eMBB service or the terminal scheduled for the URLLC service to receive and process the signal carrying the service data appropriately.

The method for facilitating coexistence of different types of services may make it possible to transmit service-specific information when eMBB service-related information and URLLC service-related information are simultaneously scheduled in part or all of a frequency band, when mMTC service-related information and URLLC service-related information are simultaneously scheduled in part or all of the frequency band, or when eMBB service-related information, URLLC service-related information, and mMTC service-related information are simultaneously scheduled.

Although the following description is made using the specific service types of mMTC, UREIC, and eMBB, the present disclosure is not limited to the embodiments with those service types but may include other embodiments with other service types.

In the following description, the term "base station (BS)" is used to indicate an entity for allocating resources to a terminal, and examples include a g Node B (gNB), an evolved Node B (eNB), node B, a radio access unit, a base station controller, and a predetermined network node. Examples of the terminal include a UE, a mobile station (MS), a cellular phone, a smartphone, a computer, and a multimedia system with a communication function.

In the following description, the term downlink (DL) denotes a radio transmission path from a base station to a terminal, and the terminal uplink (UL) denotes a radio transmission path from the terminal to the base station. Although the description is directed to an LTE or LTE-A system by way of example, the present disclosure is applicable to other communication systems having a similar technical background and channel format. For example, the present disclosure is applicable to the 5G mobile communication technology (5G NR) under development after LTE-A. It will be understood by those skilled in the art that the present disclosure can be applied even to other communication systems with a slight modification without departing from the spirit and scope of the present disclosure.

As one of the representative broadband wireless communication systems, the LTE system uses orthogonal frequency division multiplexing (OFDM) in the downlink and single carrier frequency division multiple access (SC-FDMA) in the uplink.

The term uplink denotes a radio transmission path from a terminal (or UE or MS) to a BS (gNB), and the term downlink denotes a radio transmission path from the BS to the terminal. Such multiple access schemes are characterized by allocating the time-frequency resources for transmitting user-specific data and control information without overlap each other (i.e., maintaining orthogonality) so as to distinguish among user-specific data and control information.

The LTE system adopts a hybrid automatic repeat request (HARQ) scheme for physical layer retransmission when decoding failure occurs in initial data transmission. An HARQ scheme is designed to operate in such a way that a receiver, when it fails in decoding data, sends a transmitter a negative acknowledgement (HACK) indicative of the decoding failure in order for the transmitter to retransmit the corresponding data on the physical layer. The receiver combines the retransmitted data with the decoding-failed data to improve data reception performance. The HARQ scheme may also be designed to operate in such a way that the receiver, when it succeeds in decoding data, sends the transmitter an acknowledgement (ACK) indicative of successful decoding in order for the transmitter to transmit new data.

In the following description, the terms grant-free (or SPS) resources, resources for grant-free (or SPS), and resources for grant-free (or SPS) transmission may be used interchangeably.

A reference signal is a signal for use in measuring channel condition factors (such as channel strength and distortion, interference strength, and Gaussian noise) between a base station and users to help demodulation and decoding on received data symbol. Another main purpose of the reference signal is radio channel condition measurement. The receiver measures received signal strength of the reference signal that is transmitted at a pre-agreed transmit power level over a radio channel to determine the radio channel condition between the transmitter and the receiver. The measured radio channel condition may be used to determine a data rate for which the receiver request to the transmitter.

In a normal mobile communication system operating with constrained radio resources (such as time, frequency, and transmit power), the radio resource allocation for transmitting reference signals means reduction of the radio resources for transmitting data signals. For this reason, it is necessary to determine the radio resources for transmitting the reference signal in consideration of the system throughput. Particularly in a system adopting a MIMO scheme operating with multiple antennas, it is one of very important technical issues to allocate reference signal resources and perform measurement thereon.

In the 5G system, the system frequency bandwidth of the base station and the UE-specific bandwidth may differ from each other. When the system frequency bandwidth and UE-specific bandwidth differ from each other, the base station may indicate to the UE to perform downlink data reception and uplink data transmission per frequency band. This may be achieved with the introduction of a concept of BWP in which a UE is configured with multiple BWP candidates in the system frequency band and may activate one or more BWPs for uplink data transmission and downlink data reception.

In the 5G system, it may be possible to configure radio resources for SPS in both the downlink and uplink as in LTE. The SPS resources are configured for periodically occurring traffic such as VoIP traffic and emergency service traffic such as URLLC service traffic. In addition to the SPS, it may also be possible to preconfigure a periodically allocated resources for grant-free use. The UE may transmit (or receive) data without receipt of any uplink scheduling information being conveyed in an uplink grant.

The UE may transmit or receive data without receipt of any control information on the radio resources. In the 5G system, it is allowed to schedule a second service such as URLLC in part of the radio resource region in which a first service such as eMBB is already scheduled for supporting multiplex of the eMBB and URLLC.

In such a situation, the UE which is supposed to receive the first service may not determine whether the second service is scheduled in part of the radio resource region scheduled for the first service. There is therefore a need of a method for transmitting information (e.g., interruption) indicating such a situation to the UE (or multiple UEs) allocated the resource regions for receiving the first service. This information may be referred to as interruption indicator (or puncturing indicator or a preemption indicator).

When the UE(s) configured with multiple BWP candidates performs data transmission/reception in active BWP every transmission/reception occasion, the periodic radio resource region configured for grant-free scheduling or the interruption indicator search scheme may vary in association with the periodic radio resource region or the resource region that may be indicated by the interruption indicator or according to the change of the BWP in actual use by the UE.

Also, there is a need of defining gNB and UE operations when, while the UE is performing transmission in the radio resource region configured for SPS or grant-free transmission, the BWP including the corresponding resources is changed. Also, there is a need of defining gNB and UE operations for the case where part of the radio resources configured for SPS or grant-free transmission is overlapped with a resource region in which scheduling information (uplink grant) is transmitted.

FIG. 1 is a diagram of a basic time-frequency resource structured for transmitting downlink data or control channel in an LTE or LTE-A system.

Referring to FIG. 1, the horizontal axis denotes the time, and the vertical axis denotes the frequency. The smallest transmission unit in the time domain is an OFDM symbol, $N_{symb}$ OFDM symbols 102 forms a slot 106, and 2 slots forms a subframe 105. Each slot spans 0.5 ms, and each subframe spans 1.0 ms. A radio frame 114 is a time unit consisted of 10 subframes. In the frequency domain, the smallest transmission unit is a subcarrier, and the total system transmission bandwidth consists of $N_{BW}$ subcarriers 104.

In the time-frequency resource structure, the basic resource unit is a resource element (RE) indicated by an OFDM symbol index and a subcarrier index. A resource block (RB) (or physical resource block (PRB)) 108 is defined by $N_{symb}$ consecutive OFDM symbols 102 in the time domain and NRB consecutive subcarriers 110 in the frequency domain. That is, one RB 108 is made up of $N_{symb} \times N_{RB}$ REs 112. Typically, the RB is the smallest data transmission unit. In the LTE system, $N_{symb}=7$, $N_{RB}=12$, and $N_{BW}$ and $N_{RB}$ are proportional to the system transmission bandwidth. The data rate increased in proportion to the number of RBs scheduled for the terminal.

For the LTE system, 6 transmission bandwidths are defined. When a frequency division duplex (FDD) system in which downlink and uplink are separated in frequency, the downlink transmission bandwidth and uplink transmission bandwidth may differ from each other. The channel bandwidth denotes an RF bandwidth in comparison with the system transmission bandwidth. Table 1 shows the relationship between the system transmission bandwidth and channel bandwidth defined in the LTE standard. For example, an LTE system having 10 MHz channel bandwidth uses the transmission bandwidth of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The downlink control information (DCI) is transmitted in N OFDM symbols at the beginning of the subframe. Typically, N={1, 2, 3}. Accordingly, N value varies at every subframe depending on the control information amount to be transmitted. The control information includes a control channel transmission period indicator for indicating a number of OFDM symbols for conveying the control information, scheduling information for downlink or uplink data transmission, and an HARQ ACK/NACK signal.

In the LTE system, the downlink or uplink data scheduling information is transmitted from the base station to the terminal using DCI. The UL denotes a radio link for transmitting data or control signals from the terminal to the base station, and the DL denotes a radio link for transmitting data or control signals from the base station to the terminal. The DCI is categorized into different DCI formats depending on the purpose (e.g., indicating UL grant for UL data scheduling or DL grant for DL data scheduling, indicating usage for control information that is small in size, indicating whether multiple antenna-based spatial multiplexing is applied, and indicating usage for power control). The DCI format 1 for DL grant is configured to include at least the following information.

Resource allocation type 0/1 flag indicates whether the resource allocation scheme is Type 0 or Type 1. A Type-0 is to allocate resources in units of resource block group (RBG) by applying a bitmap scheme. In the LTE system, the basic unit of scheduling may be a RB that is expressed by time-frequency domain resources, and the RBG may include multiple RBs and may be the basic unit of scheduling in the Type-0 scheme. A Type-1 is to allocate a particular RB in an RBG.

Resource block assignment indicates an RB allocated for data transmission. The resources may be determined depending on the system bandwidth and the resource allocation scheme.

Modulation and coding scheme (MCS) indicates a modulation scheme used for data transmission and a size of a transport block (TB) to be transmitted.

HARQ process number indicates a process number of HARQ.

New data indicator indicates whether the HARQ transmission is an initial transmission or a retransmission.

Redundancy version (RV) indicates a redundancy version of HARQ.

Transmit power control (TPC) command for physical uplink control channel (PUCCH) indicates a power control command for a PUCCH that is an uplink control channel.

The DCI may be transmitted over a physical downlink control channel (PDCCH) or enhanced PDCCH (EPDCCH) after undergoing a channel coding and modulation process. PDCCH transmission/reception may be understood as DCI transmission/reception on the PDCCH. Other channels may be understood in a similar way.

Typically, the DCI may undergo channel coding for each terminal independently, and then the channel-coded DCI may be configured with its dependent PDCCH and transmitted. In the time domain, a PDCCH may be mapped and transmitted during the control channel transmission period. The frequency-domain mapping location of the PDCCH may be determined by an ID of each terminal, and it may be spread throughout the entire system transmission band.

Downlink data may be transmitted over a physical downlink shared channel (PDSCH) that is a physical channel for downlink data transmission. A PDSCH may be transmitted after the control channel transmission period, and the scheduling information such as the detailed mapping location in the frequency domain and the modulation scheme may be indicated by the DCI that is transmitted over the PDCCH.

Using a 5-bit MCS in the control information constituting the DCI, the base station notifies the terminal of the modulation scheme applied to the PDSCH to be transmitted and the size of data (e.g., transport block size (TBS)) to be transmitted. The TBS corresponds to the size given before channel coding for error correction is applied to the data (e.g., TB) to be transmitted by the base station.

The modulation schemes supported by the LTE system may include quadrature phase shift keying (QPSK), 16 quadrature amplitude modulation (QAM), and 64QAM, and they have modulation orders ($Q_m$) 2, 4, and 6, respectively. The QPSK modulation transmits 2 bits per symbol, the 16QAM transmits 4 bits per symbol, and the 64QAM transmits 6 bits per symbol.

Figure 2:
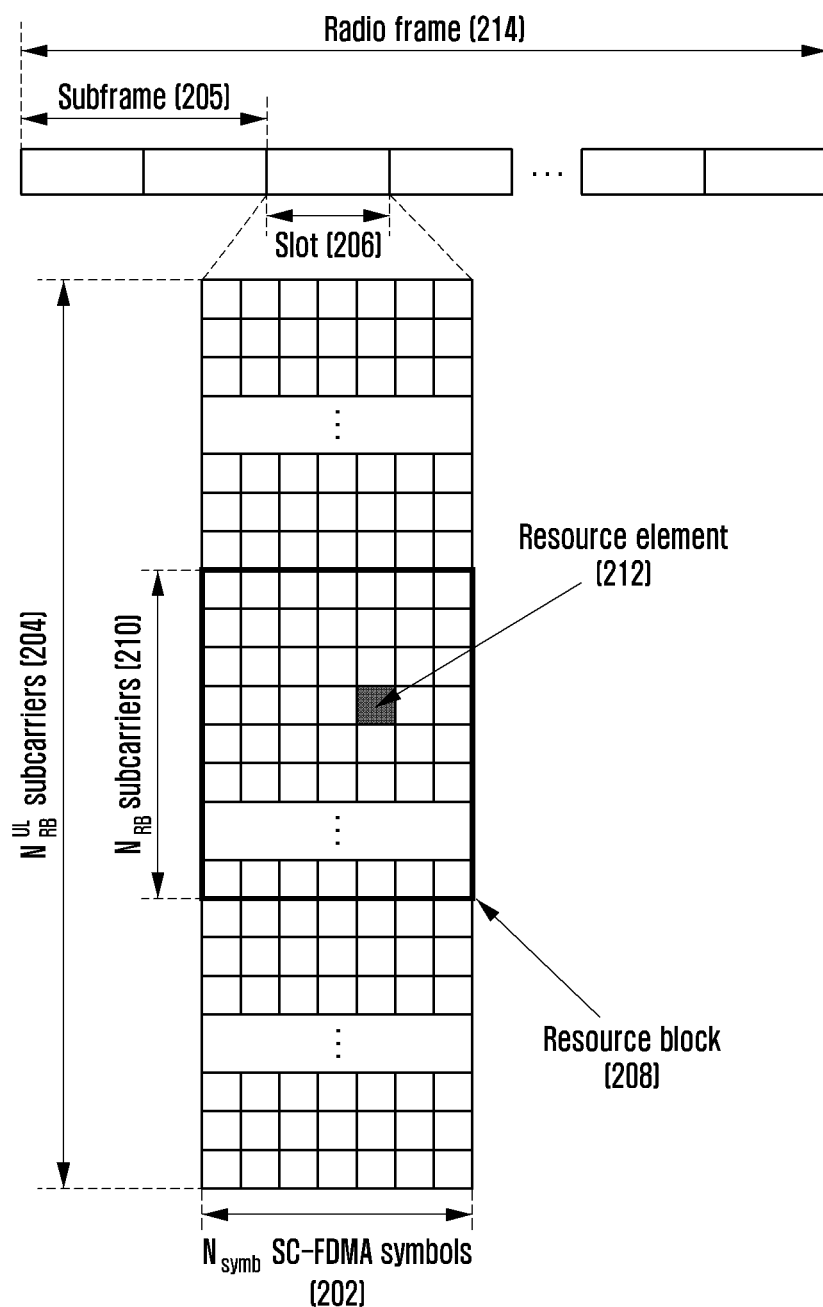
FIG. 2 is a diagram of a basic time-frequency resource structure for transmitting uplink data or control channels in an LTE or LTE-A system.

FIG. 2 is a diagram of a basic time-frequency resource structure for transmitting uplink data or control channels in an LTE or LTE-A system.

Referring to FIG. 2, the horizontal axis denotes the time, and the vertical axis denotes the frequency. The smallest transmission unit in the time domain is SC-FDMA symbol, and $N_{symb}$ SC-FDMA symbols 202 form a slot 206. Two slots form a subframe 205. The smallest transmission unit in the frequency domain is subcarrier, and the total system transmission bandwidth consists of $N_{RB}^{UL}$ subcarriers 204. $N_{RB}^{UL}$ is proportional with the system transmission bandwidth.

In the time-frequency domain, the basic resource unit is RE 212, and each RE is defined by one SC-FDMA symbol index and one subcarrier index. An RB or PRB 208 is defined by $N_{symb}$ consecutive SC-FDMA symbols in the time domain and $N_{RB}$ consecutive subcarriers in the frequency domains. Accordingly, one RB is made up of $N_{symb} \times N_{RB}$ REs. Typically, the smallest data or control information transmission unit is RB. A PUCCH is mapped to a frequency region corresponding to one RB and transmitted during a time period of one subframe.

The LTE standard defines a relationship between the PDSCH or the PDCCH/EPDCCH carrying a SPS release and the PUCCH or PUSCH carrying the HARQ ACK/NACK corresponding to the PDSCH, PDCCH, or EPDCCH. In an LTE system operating in the FDD mode, the HARQ ACK/NACK corresponding to the PDSCH or the PDCCH or EPDCCH carrying the SPS release, the PDSCH or the PDCCH or EPDCCH being transmitted at the $(n-4)^{th}$ subframe, is carried in the PUCCH or PUSCH being transmitted at the $n^{th}$ subframe.

The LTE employs an asynchronous HARQ scheme for DL HARQ. If an eNB receives an HARQ NACK for initially transmitted data from a UE, it may freely determine a retransmission timing through a scheduling operation. If the UE fails to decode the received data, it stores the erroneous initial data and combines the buffered data with the retransmitted data.

If the UE receives a PDSCH carrying the DL data transmitted by the eNB at the $n^{th}$ subframe, it transmits UL control information including the HARQ ACK/NACK corresponding to the DL data to the eNB through the PUCCH or PUSCH at $(n+k)^{th}$ subframe. Here, k is determined differently depending on the duplex mode (i.e., FDD or time division duplex (TDD)) and subframe configuration in use by the LTE system. For example, k is fixed to 4 in the FDD LTE system. Whereas, k may vary according to the subframe configuration and subframe index in the TDD LTE system. When transmitting data on multiple carriers, the value of k may vary according to the TDD configuration per carrier.

Unlike the DL HARQ, the LTE employs a synchronous HARQ scheme with a fixed data transmission timing. The UL-DL timing relationship between the PUSCH and PDCCH that is followed by the PUSCH and a physical hybrid indicator channel (PHICH) carrying the DL HARQ ACK/NACK corresponding to the PUSCH is fixed according to a rule as follows.

If the UE receive a PDCCH carrying UL scheduling control information or a PHICH carrying a DL HARQ ACK/NACK from the eNB at $n^{th}$ subframe, it transmits UL data through a PUSCH at the $(n+k)^{th}$ subframe based on the control information. Here, k is determined differently depending on the duplex mode in use (i.e., FDD or TDD) and its configuration. For example, k is fixed to 4 in the FDD LTE system. Whereas, k is variable according to the subframe configuration and subframe index in the TDD LTE system. When transmitting data over multiple carriers, the value of k may differ according to the carrier-specific TDD configuration.

The UE receives the PHICH carrying the DL HARQ ACK/NACK from the eNB at the $i^{th}$ subframe and the DL HARQ ACK/NACK corresponding to the PUSCH transmitted by the UE at the $(i+k)^{th}$ subframe. Here, k is determined differently depending of the duplex mode FDD or TDD) and its configuration in use by the LTE system. For example, k is fixed to 4 in the FDD LTE system. Whereas, k is variable according to the subframe configuration and subframe index in the TDD LTE system. When transmitting data over multiple carriers, the value of k may differ according to the carrier-specific TDD configuration.

TABLE 2

| | PDCCH and PDSCH configured by C-RNTI (cell radio network temporary identifier) | | |
|---|---|---|---|
| Transmission mode | DCI format | Search Space | Transmission scheme of PDSCH corresponding to PDCCH |
| Mode 1 | DCI format 1A | Common and UE specific by C-RNTI | Single antenna port, port 0 |
| | DCI format 1 | UE-specific by C-RNTI | Single-antenna port, port 0 |
| Mode 2 | DCI format 1A | Common and UE-specific by C-RNTI | Transmit diversity |
| | DCI format 1 | UE-specific by C-RNTI | Transmit diversity |
| Mode 3 | DCI format 1A | Common and UE-specific by C-RNTI | Transmit diversity |
| | DCI format 2A | UE-specific by C-RNTI | Large delay CDD or transmit diversity |

TABLE 2-continued

PDCCH and PDSCH configured by C-RNTI (cell radio network temporary identifier)

| Transmission mode | DCI format | Search Space | Transmission scheme of PDSCH corresponding to PDCCH |
|---|---|---|---|
| Mode 4 | DCI format 1A | Common and UE-specific by C-RNTI | Transmit diversity |
|  | DCI format 2 | UE-specific by C-RNTI | Closed-loop spatial multiplexing or transmit diversity |
| Mode 5 | DCI format 1A | Common and UE-specific by C-RNTI | Transmit diversity |
|  | DCI format 1D | UE-specific by C-RNTI | Multiuser MIMO |
| Mode 6 | DCI format 1A | Common and UE-specific by C-RNTI | Transmit diversity |
|  | DCI format 1B | UE-specific by C-RNTI | Closed-loop spatial multiplexing using a single transmission layer |
| Mode 7 | DCI format 1A | Common and UE-specific by C-RNTI | If number of PBCH antenna ports is one, single-antenna port, port 0 is used, or transmit diversity |
|  | DCI format 1 | UE-specific by C-RNTI | Single-antenna port; port 5 |
| Mode 8 | DCI format 1A | Common and UE-specific by C-RNTI | If the number of PBCH antenna ports is on, single-antenna port, port 0 is used (see otherwise transmit diversity) |
|  | DCI format 2B | UE-specific by C-RNTI | Dual layer transmission, ports 7 and 8; or single antenna port, port 4 or 8 |

Table 2 shows DCI formats supported in the respective transmission modes under the condition of being configured by C-RNTI in the 3GPP LTE TS 36.213. The UE performs search and decoding under the assumption of the existence of the corresponding DCI format in the control region according to a predetermined transmission mode. For example, if transmission mode 8 is indicated, the UE may search for DCI format 1A in the common search space and the UE-specific search space and DCI format 2B in only the UE-specific search space.

Although the above-description is directed to the LTE system, the method of the present disclosure is applicable to various radio communication systems including 5G NR. The value of k may be changed to be applied in a different radio communication system using a modulation scheme corresponding to FDD.

Figure 3:
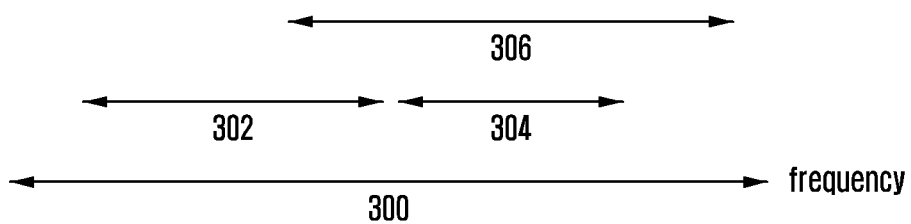
FIG. 3 is a diagram of a bandwidth part configuration and management procedure of a UE, according to an embodiment.

FIG. 3 is a diagram of a bandwidth part configuration and management procedure of a UE, according to an embodiment.

Referring to FIG. 3, it may be possible to configure multiple downlink or uplink BWPs in a whole system bandwidth 300 via UE-specific or common higher layer signaling. As shown in FIG. 3, the whole or part of the system bandwidth may be configured as a BWP candidate for uplink or downlink transmission as denoted by reference numbers 300, 302, 304, and 306. It may also be possible to configure one or more BWP candidates as the BWPs for uplink/downlink data transmission/reception.

The BWPs for UL data transmission and DL data transmission may be identical with or different from each other. The BWP for UL/DL data transmission may be switched to a BWP for data transmission in the opposition direction via a UE-specific or common higher layer signaling (or L1 signaling). A certain BWP may be part of another BWP or include part of another BWP.

The UE may configure the BWP 302 as a DL BWP and the BWP 304 as a UL BWP. The UE may configure the BWP 302 as both the DL and UL BWP. The UE may the DL BWP from the BWP 302 to the BWP 306 as indicated via a UE-specific or common higher layer signaling or LI signaling.

The L1 signaling-based BWP switching may be performed using the DCI for data scheduling or setting a predetermined field (e.g., MCS field, frequency or time resource allocation field, and NDI field) in a separate DCI. In the latter case, ACK/NACK feedback may be required or not. If the ACK/NACK feedback is required in the latter case, the base station may determine whether to perform the BWP switching based on the ACK/NACK feedback.

The UE may be configured with a default BWP for receiving the common higher layer signaling information such as the master information block (MIB) and a system information block (SIB). It may also be possible to use a timer set to a value indicated via UE-specific or common L1 signaling or higher layer signaling such that the UE switches from the changed BWP back to the default BWP upon expiry of the timer.

FIG. 4 is a diagram of an SPS or grant-free resources configuration and data transmission/reception method of a terminal, according to an embodiment.

Referring to FIG. 4, a base station may configure SPS or grant-free resources in uplink and downlink in various manners.

As a first approach, the base station transmits SPS or grant-free resource configuration information to the UE via UE-specific or common higher layer signaling. The SPS or grant-free resource configuration information may include at least one of frequency and time resources information for data transmission reception with the SPS or grant-free resources, repetition interval, MCS, RV, use/disuse repetitive transmission, maximum number of repetitive transmission, transmission (or reception) offset, valid time, HARQ ACK resource configuration information and presence/absence thereof, TBS value, and DMRS configuration information.

As a second approach, the base station may transmit, to the UE, part of the SPS or grant-free resource configuration information via UE-specific or common higher layer signal and the remaining information via common or UE-specific L1 signaling. The information on the interval of the SPS or grant-free resources may be configured via UE-specific or common higher layer signaling while the information on the frequency and time resources for data transmission/reception with the SPS or grant-free resources, repetition interval of the SPS or grant-free resources, MCS, RV, and use/disuse of repetitive transmission, maximum number of repetitive transmission, and transmission (or reception) offset may be configured via common or UE-specific L1 signaling. Part of the above information may be transmitted via higher layer signaling or L1 signaling.

If the SPS or grant-free resource configuration information is signaled via higher layer signal as in the first approach, the UE may receive or transmit data using the resources (402,404.406.408) configured via the higher layer signaling without separate L1 signaling. The UE may receive or transmit data based on the SPS or grant-free resource configuration information received via higher layer signaling without searching for the control information for scheduling the corresponding data.

If part of the SPS or grant-free resource configuration information is transmitted via UE-specific or common higher layer signal and the remaining information is transmitted via common or UE-specific L1 signaling as in the second approach, the UE may receive or transmit data using the resources (412,414,416,418) configured via both higher layer signaling and L1 signaling without searching for the control information for scheduling the corresponding data.

Figure 5:
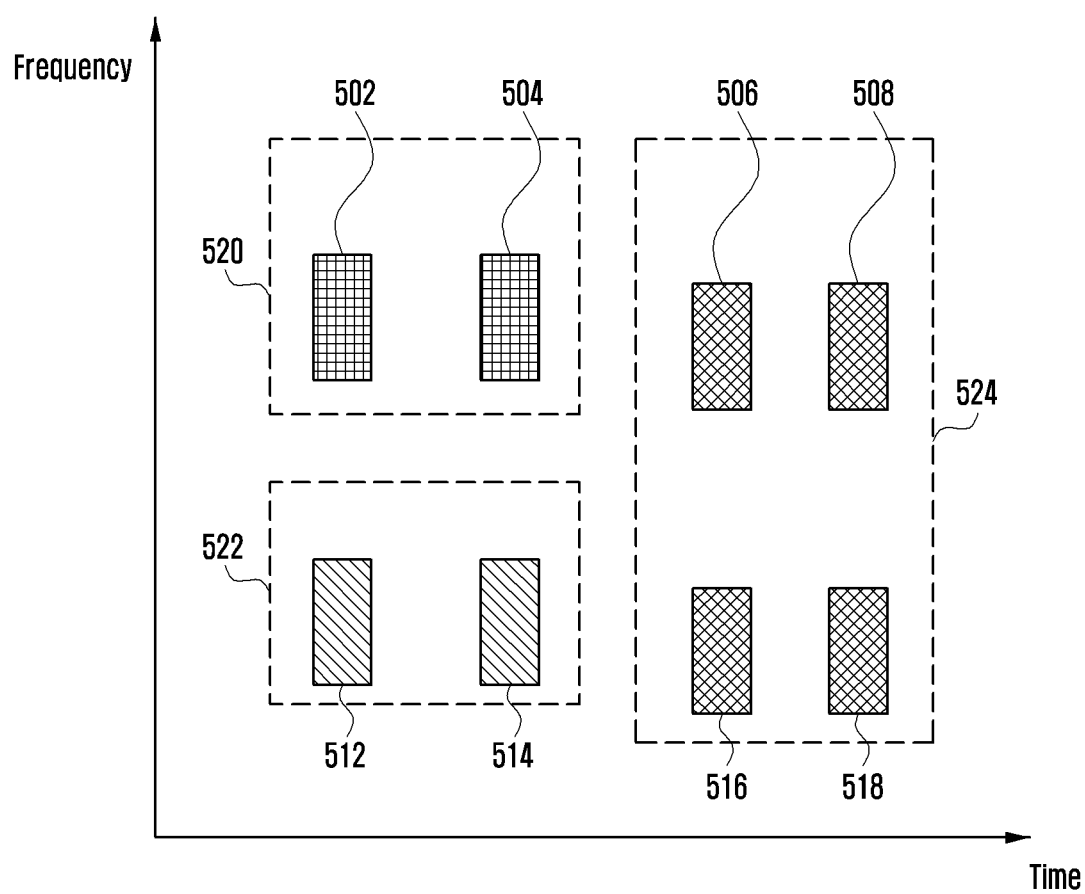
FIG. 5 is a diagram of a relationship between BWP configuration and SPS or grant-free resource configuration, according to an embodiment.

FIG. 5 is a diagram of a relationship between BWP configuration and SPS or grant-free resource configuration, according to an embodiment.

Referring to FIG. 5, when BWP candidates are configured, it may be possible to configure uplink and downlink SPS or grant-free resources separately or simultaneously in respective BWP candidates. That is, it may be possible to configure SPS or grant-free resources via UE-specific or common higher layer signaling.

As shown in FIG. 5, when the BWP 520 is configured via higher layer signaling, the SPS or grant-free resources 502 and 504 may be configured simultaneously or separately. The frequency or time information associated with the SPS or grant-free resources 502 and 504 may be configured based on the criterion of the BWP 520 or the whole system frequency band.

The frequency or time information associated with the SPS or grant-free resources 502 and 504 may be configured based on at least one of the criteria of boundary frequencies (values), center frequency (value), and bandwidth (or unit of frequency band configuration) of the BWP 520.

As shown in FIG. 5, when the BWP 522 is configured via higher layer signaling, the SPS or grant-free resources 512 and 514 may be configured simultaneously or separately. The frequency or time information associated with the SPS or grant-free resources 512 and 514 may be configured based on the criterion of the BWP 522 or the whole system frequency band. The frequency or time information associated with the SPS or grant-free resources 512 and 514 may be configured based on at least one of the criteria of bound frequencies (values), center frequency (value), and bandwidth (or unit of frequency band configuration) of the BWP 522.

When the BWP 524 is configured via higher layer signaling, the SPS or grant-free resources 506, 508, 516, and 518 may be configured simultaneously or separately. The frequency or time information associated with the SPS or grant-free resources 506, 508, 516, and 518 may be configured based on the criterion of the BWP 524 or the whole system frequency band. The frequency or time information associated with the SPS or grant-free resources 506, 508, 516, and 518 may be configured based on at least one of the criteria of bound frequencies (values), center frequency (value), and bandwidth (or unit of frequency band configuration) of the BWP 524.

After configuring the SPS or grant-free resources in the respective BWPs 520, 522, and 524, whether to actually use the configured SPS or grant-free resources is determined based on the corresponding BWP is actually used.

When it is configured or indicated to use the BWP 520 for DL or UL data transmission, among the BWP candidates depicted in FIG. 5, via higher layer signaling or L1 signaling, the UE may determine to use the SPS or grant-free resources 502 and 504 included in the BWP 520 for DL reception or UL transmission.

The SPS or grant-free resources 502 and 504 may be configured in the same frequency band or different frequency bands. SPS or grant-free resources 512 and 514 may be configured in the same frequency band or different frequency bands. SPS or grant-free resources 506 and 508 may be configured in the same frequency band or different frequency bands. SPS or grant-free resources 516 and 518 may be configured in the same frequency band or different frequency bands. Although all BWPs have respective SPS or grant-free resources in FIG. 5, it may also be possible to configure a certain BWP without SPS or grant-free resources via higher layer signaling with separate SPS or grant-free resource configuration information.

The SPS or grant-free resources configuration information and BWP configuration information (BWP candidate information or active BWP information) may be transmitted via common or UE-specific higher layer signaling separately or at one time.

The SPS or grant-free resources located in each BWP may be configured with different configuration parameters values. The configuration parameters may include a unit of frequency, a unit of time, a resource configuration information interval, a resource size in frequency, and a resource size in time.

It may be possible to configure the SPS or grant-free resources in consideration of at least one of a common offset, a frequency band location, and a frequency band range value in each BWP. Although the BWPs may be configured to have different frequency bandwidths at different frequency locations, the SPS or grant-free resources may be configured based on common information. The offset value may be configured based on the center frequency of the corresponding BWP, and the frequency location and bandwidth may be determined by a function a reference value and a size of the corresponding BWP.

When configuring the SPS or grant-free resources, the reference value for use in determining a bandwidth of each frequency band is fixed regardless of the configured individual bands. The reference value may be set based on at least one of maximum frequency bandwidth, minimum frequency bandwidth, intermediate frequency bandwidth, and frequency bandwidth indicated via control information. The offset and range may be configured based on the reference value. The unit of the offset and range may be configured differently according to the BWP size. The start and end frequencies values of a frequency band may be configured based on the reference value. The unit of the start and end frequencies values may be configured differently according to the BWP size.

It may be possible to use a bitmap for configuring SPS or grant-free resources. A common bitmap field size may be commonly applied for the individual bandwidths. The unit of frequency band (or grain size or granularity) indicated by bit in the bitmap may differ according to the BWP size.

The bitmap field may be applied per BWP. The whole bitmap field size may differ by BWP. In the case where the whole bitmap field size differs by BWP, part of the bits for configuring SPS or grant-free resources may not be used in some BWPs.

The SPS or grant-free resources regions located in different BWPs may be configured with the configuration information different in whole or in part.

The SPS or grant-free resources regions located in different BWPs may be configured through different configuration schemes. The SPS or grant-free resources regions located in BWP A may be configured via UE-specific higher layer signaling while the SPS or grant-free resources regions located in BWP B may be configured via combination of UE-specific higher layer signaling and L1 signaling.

The configuration information may include at least one of resource (monitoring) interval information, frequency allocation information, an offset value, time allocation information, an MCS value, a TBS value, an RV value, a maximum number of repetitive transmission, DMRS configuration information, and transmit power information.

When the UE receives resource configuration information for the SPS or grant-free resource configuration regions via only higher layer signaling, if part of the configured resource region exists inside the BWP indicated via UE-specific higher layer signaling or L1 signaling, it may be possible to that the UE transmits and receives data without extra control information for the corresponding region.

When the UE receives the resource region configuration information for the SPS or grant-free resource regions via only higher layer signaling, if part of the configured resource region exists outside the BWP indicated via UE-specific higher layer signaling or L1 signaling, it may be possible that the UE does not transmit and receive data without extra control information related to the corresponding region.

When the UE receives the resource region configuration information for the SPS or grant-free resource regions via combination of UE-specific higher layer signaling and L1 signaling, if part of the corresponding resource region exists inside the BWP indicated via higher layer signaling or L1 signaling, it may be possible that the UE transmits and receives data without extra control information for the corresponding region.

When the UE receives the resource region configuration information for the SPS or grant-free resource regions via combination of UE-specific higher layer signaling and L1 signaling, if part of the corresponding resource region exists outside the BWP indicated via higher layer signaling or L1 signaling, it may be possible that the UE does no transmit and receive data without extra control information for the corresponding region. However, it should be noted that the resource region that cannot be use for data transmission and reception is not the target of release/deactivation. If the BWP including the corresponding resource regions is configured afterward, the UE may perform data transmission and reception in the corresponding resource region.

When the UE receives the resource region configuration information for the SPS or grant-free resource regions via combination of UE-specific higher layer signaling and L1 signaling, if part of the corresponding resource region exists inside the BWP indicated via UE-specific higher layer signaling or L1 signaling, it may be possible that the UE transmits and receives data without extra control information for the corresponding region until receipt of indication indicating release/deactivation of the corresponding region via L1 signaling.

When the UE receives the resource region configuration information for the SPS or grant-free resource regions via combination of UE-specific higher layer signaling and L1 signaling, if part of the corresponding resource region exists outside the BWP indicated via UE-specific higher layer signaling or L1 signaling, it may be possible that the UE does not transmit and receive data without extra control information for the corresponding region. However, it should be noted that the resource region that cannot be use for data transmission and reception is not the target of release/deactivation. If the BWP including the corresponding resource regions is configured afterward, the UE may perform data transmission and reception in the corresponding resource region.

Figure 6:
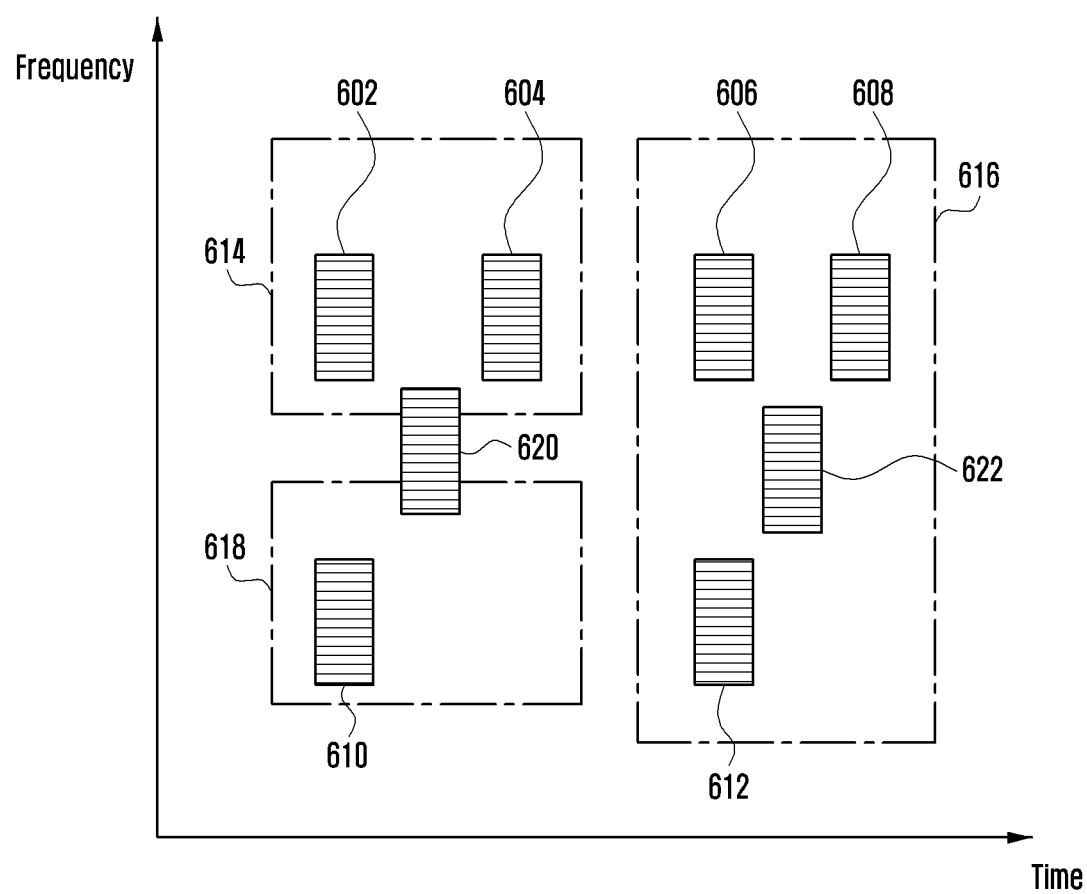
FIG. 6 is a diagram of a relationship between BWP configuration and SPS or grant-free resource configuration, according to an embodiment.

FIG. 6 is a diagram of a relationship between BWP configuration and SPS or grant-free resource configuration, according to an embodiment.

Referring to FIG. 6, the BWP and the SPS or grant-free resources are separately configured via higher layer signaling. The base station may configure to the UE the BWP candidates 614, 616, and 618 available for UL or DL data transmission via higher layer signaling or L1 signaling. The base station may also configure to the UE the SPS or grant-free resources candidates 602, 604, 606, 608, 610, 612, 620, and 622 via higher layer signaling or L1 signaling.

Unlike the method described with reference to FIG. 5, the SPS or grant-free resource regions candidates 602, 604, 606, 608, 610, 612, 620, and 622 may be configured regardless of the BWP configuration.

The SPS or grant-free resource regions candidates 602, 604, 606, 608, 610, 612. 620, and 622 may be configured based on the whole frequency band. The resource regions candidates 602, 604, 606, 608, 610, 612, 620, and 622 may be configured based on at least one of boundary frequency values, center frequency value, and bandwidth of the system frequency band, boundary frequency values, intermediate frequency value, and bandwidth of PSS/SSS/PBCH frequency band for use in initial access.

Among the SPS or grant-free resource regions candidates 602, 604, 606, 608, 610, 612, 620, and 622, the SPS or grant-free resource regions located in the BWP in use for UL or DL data transmission/reception of the UE may be used for SPS or grant-free transmission/reception of the UE. If the BWP 614 is configured for UL or DL data transmission, only the SPS or grant-free resource regions candidates 602 and 604 exist in the corresponding BWP may be used for SPS or grant-free transmission/reception of the UE. When the SPS or grant-free resource region candidate 620 is partially included in the BWP 614, the UE may use the corresponding resource region 620 all or part or may not use the corresponding resource region candidate 620 for SPS or grant-free transmission. When using the SPS or grant-free resource region in part, the UE may use the part of the corresponding resource region candidate 620 that is included in the BWP 614.

The base station may configure the BWP candidates and the SPS or grant-free resource region candidates separately or simultaneously via common or UE-specific higher layer signaling, It may be possible for the UE to determine whether each of the SPS or grant-free resource regions is included wholly or partially within the BWP in use. The configuration information for the BWP in use may be transmitted to the UE via common or UE-specific higher layer signaling. When the BWP is configured across the whole system frequency band, the UE may use all of the available SPS or grant-free resource region candidates included in the BWP for SPS or grant-free transmission. A certain BWP may include no available SPS or grant-free resource region candidate. The UE may implicitly determine that no SPS or grant-free resource is configured.

The SPS or grant-free resources and BWPs (e.g., BWP candidates and activated BWPs) may be configured via common or UE-specific higher layer signal separately or at one time.

Figure 7:
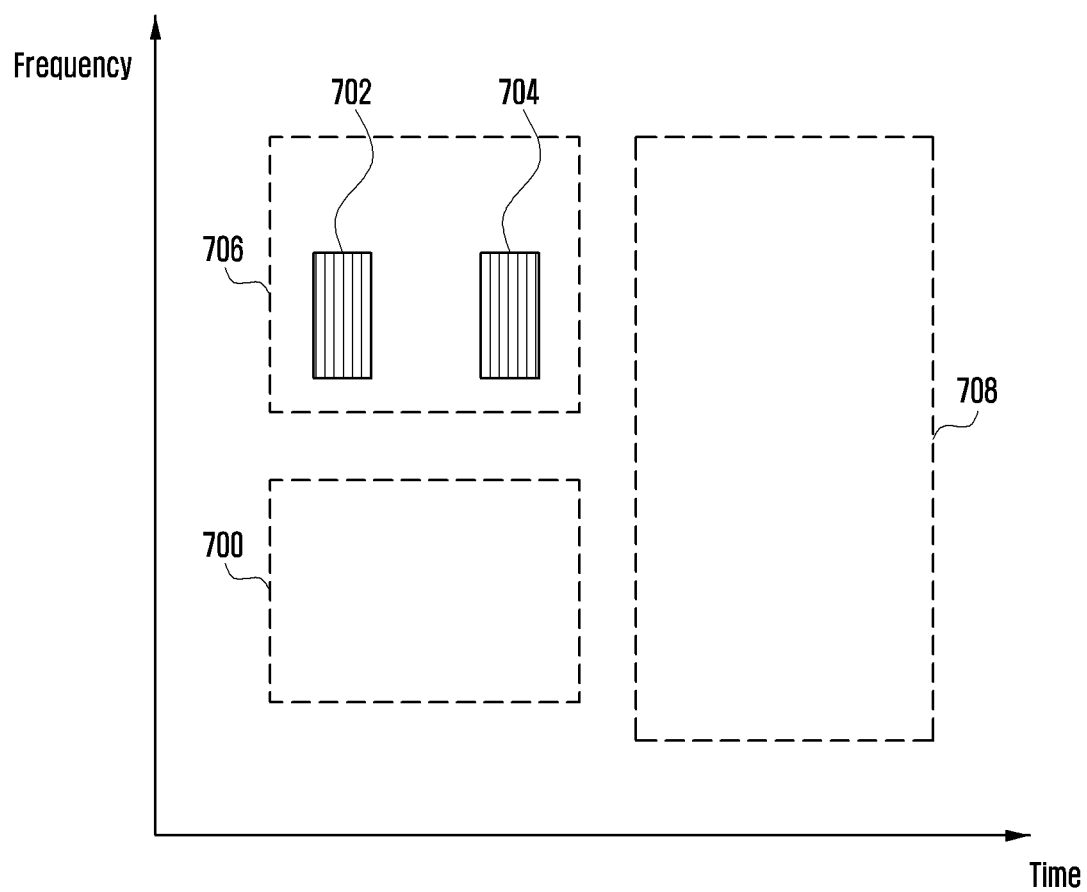
FIG. 7 is a diagram of a relationship between BWP configuration and SPS or grant-free resource configuration, according to an embodiment.

FIG. 7 is a diagram of a relationship between BWP configuration and SPS or grant-free resource configuration, according to an embodiment.

Referring to FIG. 7, the UE may be configured with multiple BWP candidates 700, 706, and 708 via UE-specific or common higher layer signaling. The UE may also receive information indicating that a certain BWP is available for use by the UE in transmitting or receiving data via UE-specific higher layer signaling or L1 signaling, separately.

After receiving the information indicating the BWP 706 is available for use by the UE in transmitting or receiving via UE-specific higher layer signaling or L1 signaling, the UE may also receive information configuring or indicating the SPS or grant-free resource region candidates 702 and 704 separately via UE-specific higher layer signaling or L1 signaling. It is considered that the SPS or grant-free resource region candidates are configured after the BWPs are configured for the corresponding UE unlike FIGS. 5 and 6.

If the information indicating that the BWP 708 is available for use by the UE in transmitting or receiving data is received via UE-specific higher layer signaling or L1 signaling, the UE may determine that there is no available SPS or grant-free resource region until receipt of information configuring or indicating SPS or grant-free resource region candidates via UE-specific higher layer signaling or L1 signaling.

It may also be possible to configure to the UE the SPS or grant-free resource configuration information and BWP configuration information (BWP candidate information or activated BWP information) separately (via identical or different types of signaling) or at one time via common or UE-specific higher layer signaling (or L1 signaling).

Figure 8:
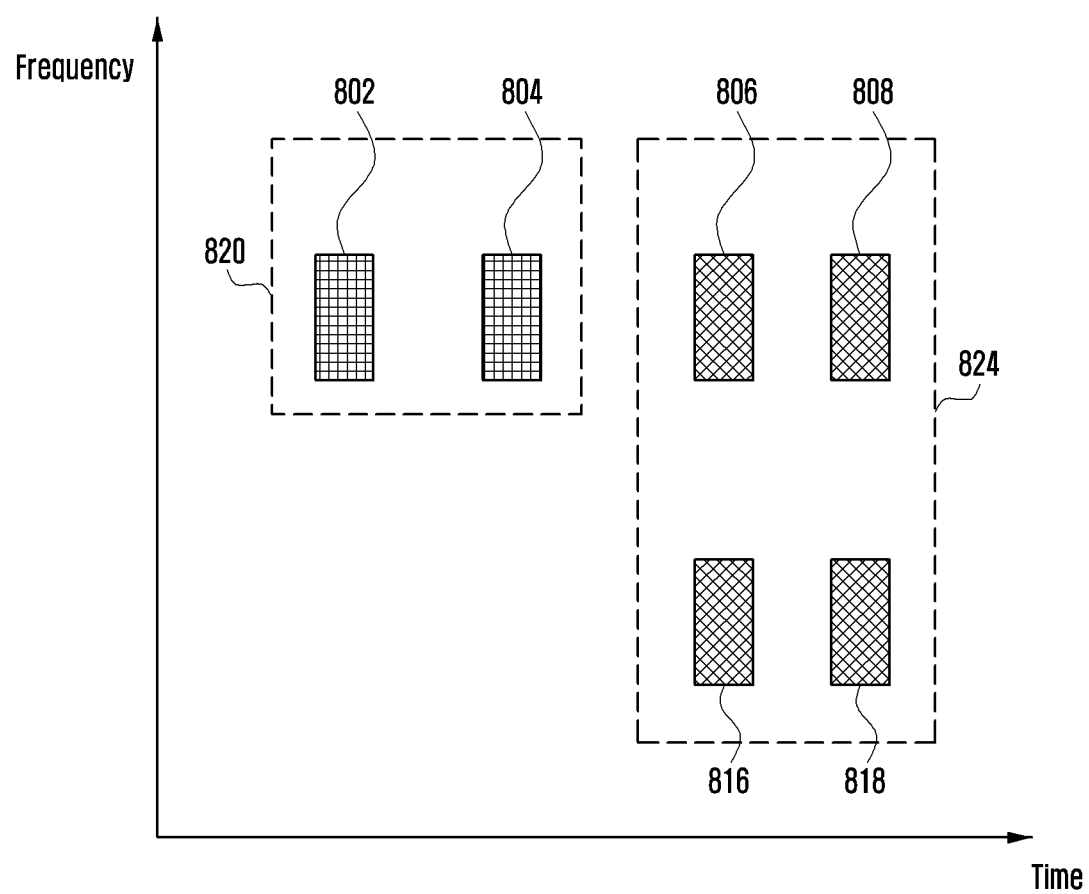
FIG. 8 is a diagram of a method for configuring SPS or grant-free resources in adaptation to change of BWP configuration, according to an embodiment.

FIG. 8 is a diagram of a method for configuring SPS or grant-free resources in adaptation to change of BWP configuration, according to an embodiment.

Referring to FIG. 8, the UE configured with BWP candidates 820 and 824 performs bandwidth switching from the BWP 820 to the BWP 824 for data transmission or reception. That is, the BWP for data transmission or reception of the UE is switched from the BWP 820 to the BWP 824 as shown in FIG. 8.

The UE may transmit or receive data in the SPS or grant free resource regions 802 and 804 preconfigured along with BWPs at one time or separately without any explicit scheduling via DCI. Afterward, if the BWP for data transmission/reception of the UE is switched from the BWP 820 to the BWP 824 via UE-specific higher layer signaling or L1 signaling, the UE may continue transmitting or receiving the data in the SPS or grant-free resource regions 806, 808, 816, and 818 preconfigured with the BWPs at one time or separately without any explicit scheduling via DCI.

The SPS or grant-free resource regions 802 and 804 and the BWP 820 may be configured at one time or separately. If the SPS or grant-free resource regions 802 and 804 and the BWP 820 are configured at one time, this may mean that the BWPs and the SPS or grant-free resource regions are configured at a time via higher layer signaling. If the SPS or grant-free resource regions 802 and 804 and the BWP 820 are configured separately, this may mean that the BWPs are configured via a combination of UE-specific higher layer signaling and UE-specific L1 signaling.

It may also be possible that the SPS or grant-free resource regions 802 and 804 included in the BWP 820 are automatically disabled via L1 signaling indicating the BWP switching from the BWP 820 to the BWP 824 without any signaling indicating deactivation/release of the corresponding resource regions.

It may also be possible that the SPS or grant-free resource regions 802 and 804 included in the BWP 820 are automatically disabled via separate signaling for deactivation/release of the corresponding SPS or grant-free resource regions.

If there is not explicit signaling indicative of deactivation/release of the SPS or grant-free resource regions 802 and 804 in the situation of BWP switching from the BWP 820 to BWP 824, it may be possible for the UE to assume that the data transmission/reception continues in the SPS or grant-free resource regions 806 and 808 within the BWP 824. Assuming that the SPS or grant-free resource regions 802, 804, 806, and 808 are configured at a regular interval in the same frequency band, if the BWP is switched from the BWP 820 to the BWP 824, the SPS or grant free resource regions 802 and 804 may be substituted by the SPS or grant free resource regions 806 and 808 of the BWP 824. It may also be possible for the UE to be configured with the SPS or grant-free resource regions 816 and 818 additionally via UE-specific higher layer signaling or L1 signaling. This configuration signaling may be performed in a way identical with or different from that of the BWP switching signaling.

When the BWP switching occurs from the BWP 820 to the BWP 824, the SPS or grant-free resource regions 806, 808, 816, and 818 may be configured along with the BWP 824 at one time or separately. If the BWP 820 and SPS or grant-free resource regions 806, 808, 816, and 818 are configured at one time, this may mean that the BWP and SPS or grant-free resource regions are configured via higher layer signaling at one time. If the BWP 820 and SPS or grant-free resource regions 806, 808, 816, and 818 are configured separately, this may mean that the BWP and SPS or grant-free resource regions are configured via a combination of UE-specific higher layer signaling and L1 signaling.

Figure 9:
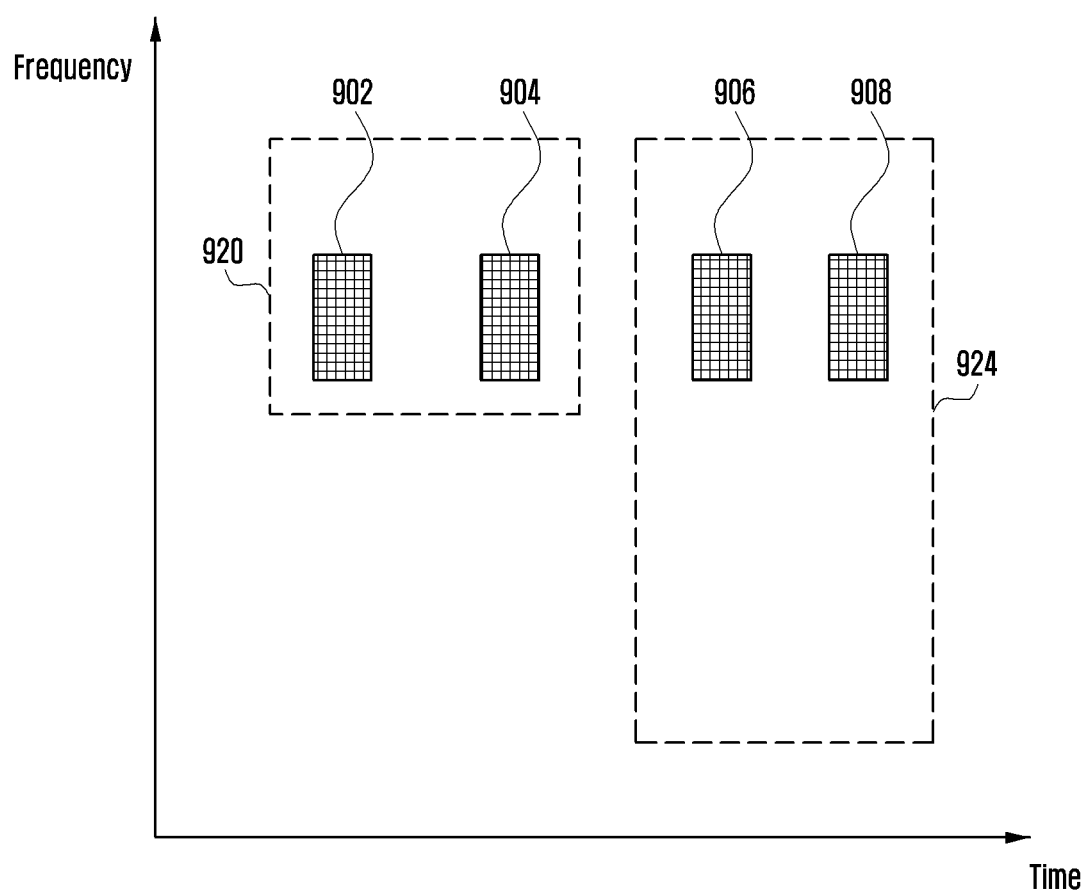
FIG. 9 is a diagram of a method for configuring SPS or grant-free resources in adaptation to change of BWP configuration, according to an embodiment.

FIG. 9 is a diagram of a method for configuring SPS or grant-free resources in adaptation to change of BWP configuration, according to an embodiment.

Referring to FIG. 9, it is assumed that BWP switching from the BWP 920 to the BWP 924 is indicated via UE-specific higher layer signaling or L1 signaling. If the UE is configured with the BWP 920 including the SPS or grant-free resource regions 902 and 904, it may perform data transmission in the corresponding resource regions without any explicit scheduling via DCI. When the BWP switching occurs from the BWP 920 to the BWP 924, if the SPS or grant-free resource regions 906 and 908 configured in the BWP 924 are identical in frequency band with the SPS or grant-free resource regions 902 and 904, the UE may continue the data transmission in the SPS or grant-free resource regions 906 and 908 without explicit scheduling via DCI. In FIG. 9, the SPS or grant-free resource regions 902, 904, 906, and 908 are configured via same higher layer signaling or L1 signaling.

Figure 10:
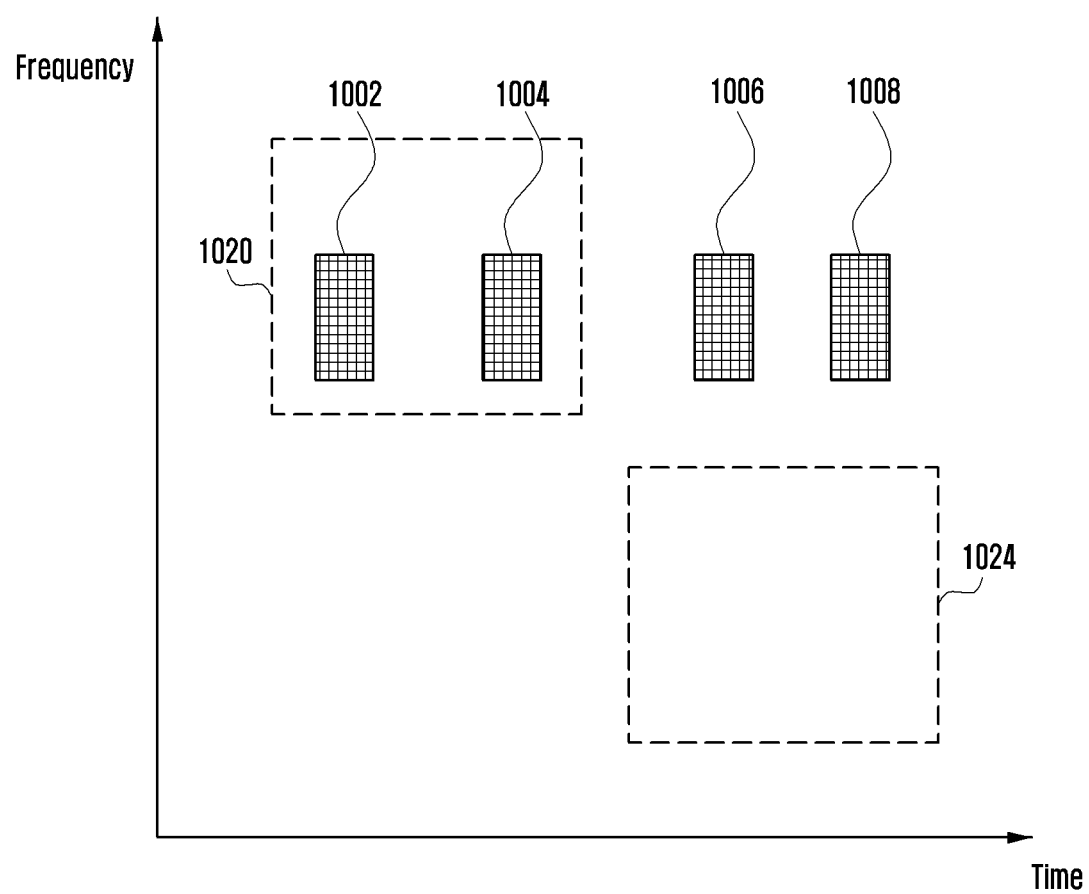
FIG. 10 is a diagram of a method for configuring SPS or grant-free resources in adaptation to change of BWP configuration, according to an embodiment.

FIG. 10 is a diagram of a method for configuring SPS or grant-free resources in adaptation to change of BWP configuration, according to an embodiment.

Referring to FIG. 10, it is assumed that BWP switching from BWP 1020 to BWP 1024 is indicated via UE-specific higher layer signaling or L1 signaling. The UE assigned BWP 1020 in which SPS or grant-free resource regions 1002 and 1004 are configured may perform data transmission or reception using the SPS or grant-free resource regions 1002 and 1004 without receipt of extra DCI. If BWP switching is performed from the BWP 1020 to the BWP 1024 in which no SPS or grant-free resource region is configured, the SPS or grant-free resource regions 1002 and 1004 may be used even though there is no indication of release/deactivation thereof via common or UE-specific L1 signaling or higher layer signaling.

The SPS or grant-free resource regions 1002, 1004, 1006, and 1008 may be configured simultaneously via higher layer signaling or L1 signaling. It may be possible that the UE uses the SPS or grant-free resource regions 1002 and 1004 located inside the BWP 1020 but the SPS or grant-free resources 1006 and 1008 located outside the BWP 1024 without receipt of separate DCI.

It may be possible that the UE uses, if there is no separate common or UE-specific L1 signaling or higher layer signaling indicative of release/deactivation of the SPS or grant-free resources 1006 and 1008 located outside the BWP 1024, the corresponding resource regions.

If the SPS or grant-free resource regions 1006 and 1008 are overlapped in part with the BWP 1024 in the frequency domain, the UE may make three different determinations. First, the UE may determine that the SPS or grant-free resource regions 1006 and 1008 are not available for use. That is, the UE assumes that the corresponding resource regions are disabled without indication of deactivating/release via L1 signaling or higher layer signaling. Second, the UE may determine that the SPS or grant-free resource regions 1006 and 1008 are available for use. That is, the UE may perform data transmission or reception in the SPS or grant-free resource regions 1006 and 1008, although they are located outside the BWP 1024, based on the pre-agreement with the base station. Third, the UE may determine that the SPS or grant-free resource regions 1006 and 1008 are overlapped in part with the BWP 1024 in the frequency and/or time domain. That is, the UE may determine part of the SPS or grant-free resource regions 1006 and 1008 as available SPS or grant-free resources and perform data transmission or reception using the available SPS or grant-free resources.

When BWP switching is performed via L1 signaling or higher layer signaling, it may be possible that the UE assumes that the SPS or grant-free resource regions that are not included (partly or wholly) in the switched BWP in the frequency domain are disabled (or not used any more) without any separate indication of release/deactivation via common or UE-specific L1 or higher layer signaling.

When BWP switching is performed via L1 signaling or higher layer signaling, it may be possible that the UE assumes that the SPS or grant-free resource regions that are not included (partly or wholly) in the switched BWP in the frequency domain are available for continuing data transmission and reception if there is no separate indication of release/deactivation via common or UE-specific L1 or higher layer signaling.

When BWP switching is performed via L1 signaling or higher layer signaling, it may be possible that the UE assumes that the SPS or grant-free resource regions used before the BWP switching is always disabled (or not used any more) without any separate indication of release/deactivation via common or UE-specific L1 or higher layer signaling (and regardless of overlap with the switched BWP).

Figure 11:
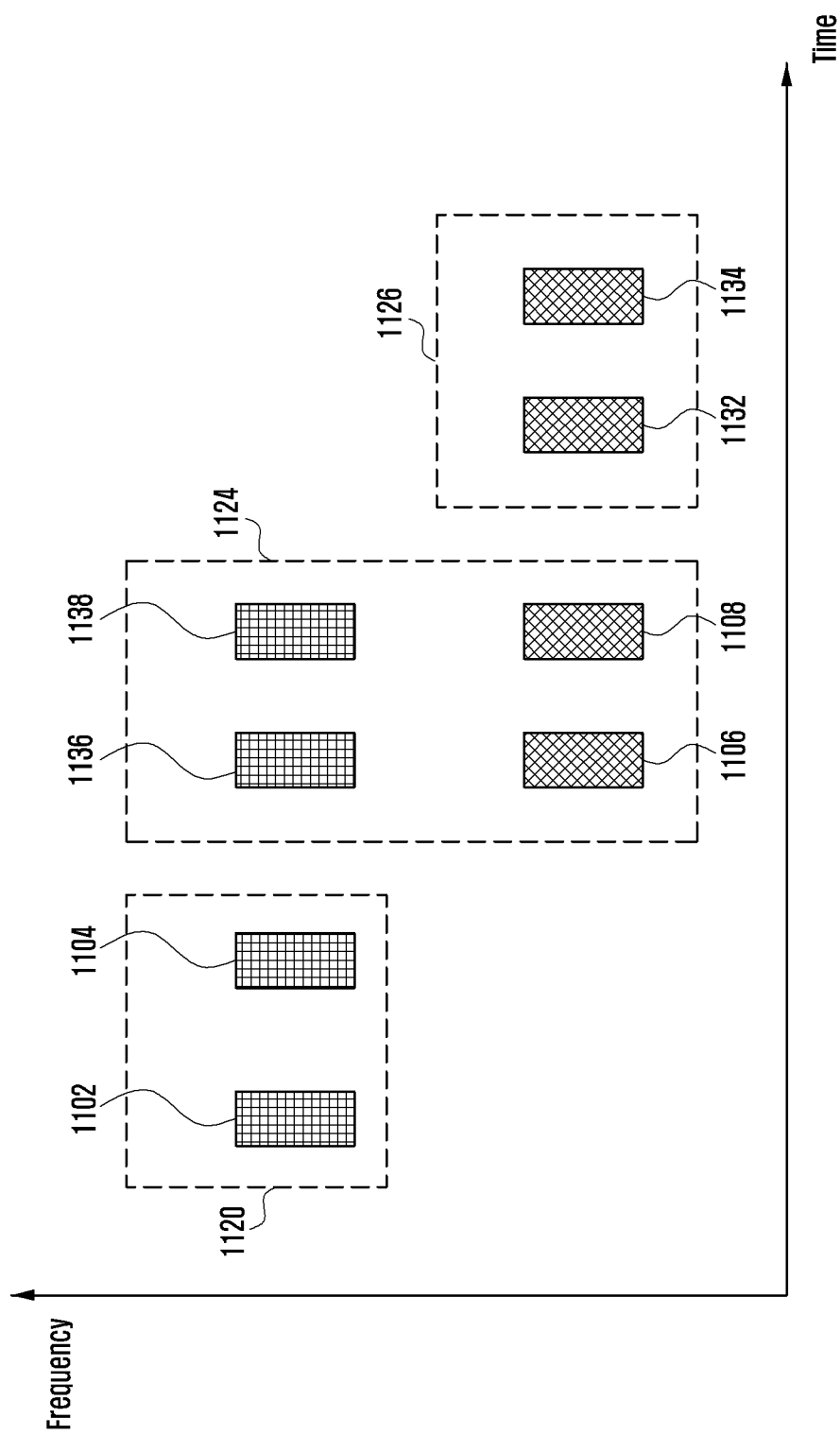
FIG. 11 is a diagram of a method for configuring SPS or grant-free resources in adaptation to change of BWP configuration, according to an embodiment.

FIG. 11 is a diagram of a method for configuring SPS or grant-free resources in adaptation to change of BWP configuration, according to an embodiment.

Referring to FIG. 11, it is assumed that BWP switching from BWP 1120 to BWP 1124 is indicated via UE-specific signaling or L1 signaling. The UE assigned BWP 1120 in which SPS or grant-free resource regions 1102 and 1104 are configured may perform data transmission or reception using the SPS or grant-free resource regions 1102 and 1104 without receipt of extra DCI.

When BWP switching is performed from the BWP 1120 to the BWP 1124 via L1 signaling or higher layer signaling, it may be possible that the UE assumes that the SPS or grant-free resources 1102 and 1104 configured in the BWP 1120 used before the BWP switching are not available in the BWP 1124 without indication of release/deactivation via common or UE-specific L1 signaling or higher layer signaling.

When BWP switching is performed from the BWP 1120 to the BWP 1124 via L1 signaling or higher layer signaling, it may be possible that the UE assumes that the SPS or grant-free resources 1106 and 1108 configured in the switched BWP 1124 are available without explicit indication of activation via common or UE-specific L1 signaling or higher layer signaling.

When BWP switching is performed from the BWP 1120 to the BWP 1124 via L1 signaling or higher layer signaling, it may be possible that the UE assumes that the SPS or grant-free resources 1106 and 1108 configured in the switched BWP 1124 are available after receipt of indication of activation via common or UE-specific L1 signaling or higher layer signaling.

If the BWP switching is performed from the BWP 1120 to the BWP 1124 in the course of repetitive data transmission and reception in the SPS or grant-free resource regions 1102 and 1104 configured in the BWP 1120 before reaching a maximum number of repetitive transmissions or receptions, the UE may continue the remaining repetitive transmission or reception using the SPS or grant-free resource regions 1136, 1138, 1106, and 1108 configured in the BWP 1124.

By way of example, if the BWP switching is performed after the UE completes data transmission or reception n times, before reaching the maximum number of repetitive transmissions or receptions 'k', in the SPS or grant-free resource regions 1102 and 1104 configured in the BWP 1120, the UE may perform the repetitive transmissions or receptions k−n times in the SPS or grant-free resource regions 1136 and 1138 or 1106 and 1107 configured in the switched BWP 1124.

If the BWP switching is performed after the UE completes data transmission or reception n times, before reaching the maximum number of repetitive transmissions or receptions 'k', in the SPS or grant-free resource regions 1102 and 1104 configured in the BWP 1120, the UE may initialize the number of repetitive transmission or receptions and perform the repetitive transmissions or receptions k times in the SPS or grant-free resource regions 1136 and 1138 or 1106 and 1107 configured in the switched BWP 1124.

If the BWP switching is performed after the UE completes data transmission or reception n times, before reaching the maximum number of repetitive transmissions or receptions 'k', in the SPS or grant-free resource regions 1102 and 1104 configured in the BWP 1120, the UE may perform the repetitive transmissions or receptions k' times (k' is the maximum number of repetitive transmissions or receptions configured along with the SPS or grant-free resource regions in the BWP 1124) in the SPS or grant-free resource regions 1136 and 1138 or 1106 and 1107 configured in the switched BWP 1124, ignoring the previously performed repetitive transmissions or receptions.

If the BWP switching is performed after the UE completes data transmission or reception n times, before reaching the maximum number of repetitive transmissions or receptions 'k', in the SPS or grant-free resource regions 1102 and 1104 configured in the BWP 1120, it may be possible that the UE stops the repetitive transmissions or receptions regardless of the presence/absence of SPS or grant-free resources in the switched BWP 1124.

When BWP switching is performed from the BWP 1120 to the BWP 1124 in the course of repetitive data transmission and reception in the SPS or grant-free resource regions 1102 and 1104 configured in the BWP 1120 before reaching a maximum number of repetitive transmissions or receptions, the UE may continue the remaining repetitive transmission or reception in the SPS or grant-free resource regions 1136, 1138, 1106, and 1108 configured in the BWP 1124.

It may be possible that the UE continues, regardless of the BWP switching, repetitive data transmission or reception in the resource regions configured with common configuration information (e.g., MCS, TBS, RV, DMRS configuration, frequency resource allocation, and HARQ process number) included in the SPS or grant-free resource region configuration information received via UE-specific higher layer signaling or L1 signaling. In a situation where the BWP switching is performed from the BWP 1120 to the BWP 1124, if the SPS or grant-free resource regions 1102, 1104, 1136, and 1138 are configured with the same configuration information (or configuration or information indicated via same UE-specific higher layer signaling or L1 signaling), the UE may perform the repetitive transmission/reception in the corresponding resource regions regardless of the BWP switching. In a situation where the BWP switching is performed from the BWP 1120 to the BWP 1124, it may be possible that the repetitive transmission/reception being performed in the SPS or grant-free resource regions 1102 and 1104 may not be continued in the SPS or grant-free resource regions 1106 and 1108 that are configured in the switched BWP 1124 via any or a combination of UE-specific higher layer signaling and L1 signaling. Also, in a situation where the BWP switching is performed from the BWP 1120 to the BWP 1124, if the SPS or grant-free resource regions 1102, 1104, 1136, and 1138 are not valid any longer in the BWP 1126 in a situation where the repetitive transmission/reception performed with the SPS or grant-free resource regions 1102, 1104, 1136, and 1138 is not completed, the repetitive transmission may be immediately terminated, because there is no valid resources in the BWP 1126, or resumed when the BWP 1126 is switched back to the BWP with the SPS or grant-free resource regions 1102 and 1104 and 1136 and 1138 before a predetermined timer expires. It may be possible that the UE terminates the repetitive transmission/reception or gives up resuming the repetitive transmission/reception although the BWP 1126 is switched back to the BWP with the SPS or grant-free resource regions 1102 and 1104 and 1136 and 1138, if the timer expires or is invalid.

Figure 12:
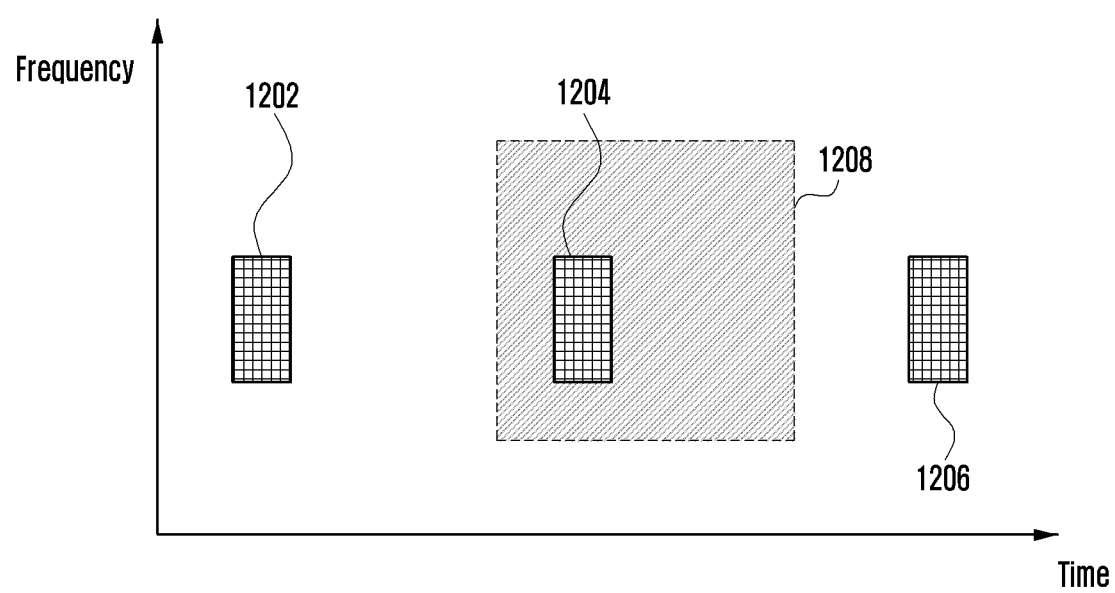
FIG. 12 is a diagram of a method for allocating grant resources and grant-free (or SPS) resources, according to an embodiment.

FIG. 12 is a diagram of a method for allocating grant resources and grant-free (or SPS) resources, according to an embodiment.

The terms grant-free (or SPS) resources, resources for grant-free (or SPS), and resources for grant-free (or SPS) transmission may be used interchangeably and have the same meaning.

Referring to FIG. 12, among the SPS or grant-free resource regions 1202, 1204, and 1206 that have been previously configured via common or UE-specific higher layer signaling or L1 signaling, the resource region 1204 is located inside a resource region 1208 in which normal DL or UL data transmission is scheduled (or granted).

When both the resource regions 1204 and 1208 are allocated for DL (or UL) data channels, the UE may take one of two different operations.

First, it may be possible that the UE receives (or transmits) rate-matched data in the grant-based resource region 1208 including the grant-free (or SPS) resource region 1204. In this case, it may also be possible that the UE performs no grant-free (or SPS) data transmission in the grant-free (or SPS) resource region 1204.

Second, it may be possible that the UE receives (or transmits) rate-matched data in the grant-based resource region 1208 with the exclusion of the grant-free (or SRS) resource region 1204. In this case, it may also be possible that the UE may perform grant-free (or SPS) data reception (or transmission) in the grant-free (or SRS) resource region 1204.

It may also be possible for the UE to take one of the two different operations depending on whether the corresponding resource region is a UE-specific resource region or a common resource region. If the grant-free (or SPS) resource region 1204 is a UE-specific resource region, it may be possible that the UE receives (or transmits) rate-matched data in the grant-based resource region 1208 including the grant-free (or SPS) resource region 1204. In this case, it may be possible that the UE performs no grant-free (or SPS) data reception (or transmission) with the grant-free (or SPS) resource region 1204. If the grant-free (or SPS) resource region 1204 is a common resource region, it may be possible that the UE receives (or transmits) rate-matched data in the grant-based resource region 1208 with the exclusion of the grant-free (or SPS) resource region 1204. In this case, it may also be possible that the UE may perform grant-free (or SPS) data reception (or transmission) in the grant-free (or SPS) resource region 1204.

It may also be possible for the UE to take one of the two different operations in the grant-free resource region 1204 depending on the higher layer signaling (or L1 signaling).

If it is indicated to perform rate matching in the grant-based resource region with the exclusion of the grant-free (or SPS) resource region via higher layer signaling (or L1 signaling), it may be possible that the UE receives (or transmits) rate-matched data in the grant-based resource region 1208 with the exclusion of the grant-free (or SPS) resource region 1204. In this case, it may also be possible that the UE perform grant-free (or SPS) data reception (or transmission) in the grant-free (or SPS) resource region 1204.

If it is indicated to perform rate matching in the grant-based resource region with the inclusion of the grant-free (or SPS) resource region via higher layer signaling (or L1 signaling), it may be possible that the UE receives (or transmits) rate-matched data in the grant-based resource region 1208 with the exclusion of the grant-free (or SPS) resource region 1204, In this case, it may also be possible that the UE performs no grant-free (or SPS) data reception (or transmission) in the grant-free (or SPS) resource region 1204.

In view of uplink, it may be possible to employ cyclic prefix OFDM (CP-OFDM) for both the grant-free and grant-based resource regions. When using discrete Fourier transform spread OFDM (DFT-S-OFDM), it may be possible that the UE receives (or transmits) rate-matched data in the grant-based resource region 1208 with the inclusion of the grant-free (or SPS) resource region 1204. In this case, it may be possible that the UE performs no grant-free (or SPS) data reception (or transmission) in the grant-free (or SPS) resource region 1204.

If both the resource regions 1204 and 1208 are allocated for uplink data channels, it may be possible that the UE uses only the grant-free (or SPS) resource region 1204 included in the grant-based resource region 1208. This operation may be applicable for transmitting data in the grant-free (or SPS) resource region 1204 only with the transmit power allowed for an emergency data service. If the transmit power is not sufficient for transmitting data in both the grant-free and grant-based resource regions, the UE may perform data transmission in the grant-free resource region with a high priority higher than that of the grant-based resource region.

It may be possible to regard the grant-free (or SPS) resource region as a resource region configured for initial access such as common or UE-specific DCI region, common or UE-specific reserved resources or PSS/SSS/PBCH.

The grant-based resource region 1208 may be activated even when BWP switching is performed as indicated via L1 signaling. If the BWP switching is indicated in uplink data scheduling via L1 signaling, there is a probability that the uplink resource region scheduled for the uplink data transmission may be overlapped with the grant-free (or SPS) resource region that has been previously configured via L1 signaling or higher layer signaling. Even in this situation, the above describe operation is applicable too.

Figure 13:
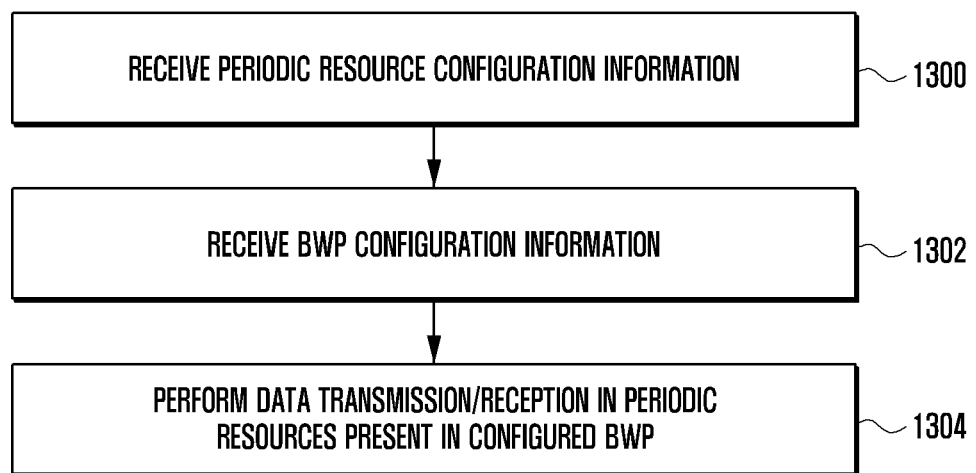
FIG. 13 is a flowchart of an SPS or grant-free resource management method of a UE, according to an embodiment.

FIG. 13 is a flowchart of an SPS or grant-free resource management method of a UE, according to an embodiment.

Referring to FIG. 13, at step 1300, the UE may receive periodic resource configuration information for SPS or grant-free data transmission or reception from a bases station via any one or combination of common or UE-specific L1 signaling and higher layer signaling. The resource configuration information may include at least one of offset, reference value (e.g., SFN 0), frequency resource information, time resource information, time resource interval, MCS, RV, HARQ process number, number of repetitive transmission, number of HARQ ACK transmissions, and presence/absence HARQ ACK.

At step 1302, the UE may receive configuration information (or indication) indicating that multiple BWP candidates can be simultaneously configured to the UE via UE-specific higher layer signaling and at least one of the BWPs can be used for data transmission or reception of the UE from the base station via UE-specific signaling (or L1 signaling). It may be possible that the UE performs SPS or grant-free data transmission or reception based on resource information associated with the SPS or grant-free resource regions existing (partially or wholly) in the BWP configured for data transmission or reception.

At step 1304, the UE may perform data transmission or reception based on the information about the periodic resources existing in the BWP as configured or indicated above without receipt of a separate DCI.

Figure 14:
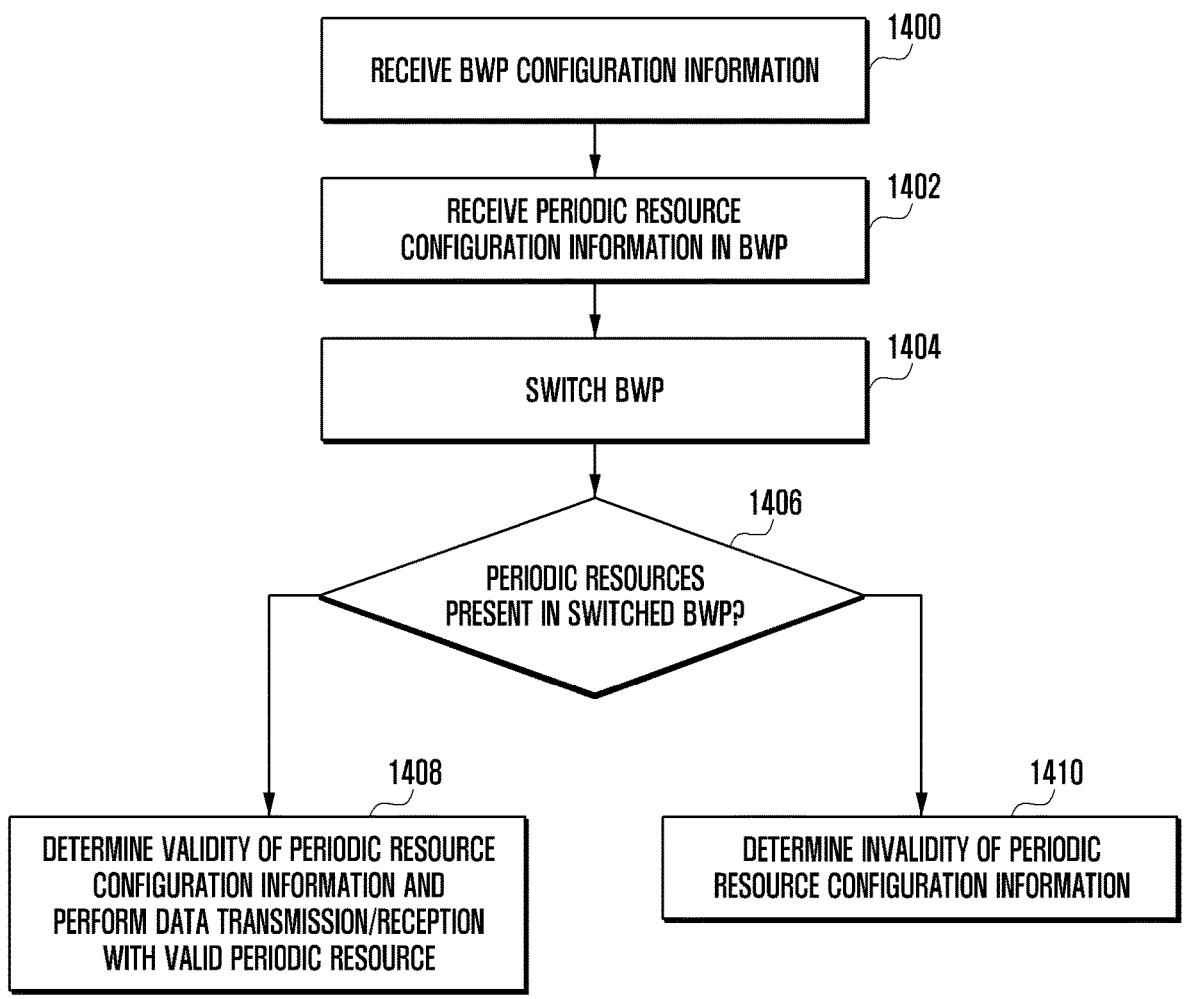
FIG. 14 is a flowchart of an SPS or grant-free resource management method of a UE, according to an embodiment.

FIG. 14 is a flowchart of an SPS or grant-free resource management method of a UE, according to an embodiment.

Referring to FIG. 14, at step 1400, the UE may receive configuration information about BWP candidates from a base station via any one or combination of common or UE-specific higher layer signaling and L1 signaling. The UE may receive information configuring or indicating the BWP for use in data transmission or reception among the BWP candidates via higher layer signaling or L1 signaling.

At step 1402, the UE may receive information on SPS or grant-free resource regions configured in the BWP for use in data transmission or reception via any one or combination of L1 signaling and higher layer signaling.

At step 1404, the UE may receive information indicating bandwidth part switching from the base station via L1 signaling or higher layer signaling.

At step 1406, the UE may determine whether the SPS or grant-free resource configuration information (e.g., frequency information) about the SPS or grant-free resource regions existing in the old BWP before the BWP switching is valid in the new BWP. The UE may determine whether the previously configured SPS or grant-free resource region is overlapped with the new BWP in the frequency domain.

If it is determined at step 1406 that the previously configured SPS or grant-free resource region is overlapped in whole (or at least in part) with the new BWP in the frequency domain, the UE may determine at step 1408 that the SPS or grant-free frequency resource information is valid even in the new BWP and perform data transmission or reception without receipt of a separate DCI.

If it is determined at step 1406 that the previously configured SPS or grant-free resource region is overlapped at least in part with the new BWP in the frequency domain, the UE may determine at step 1410 that only the part of the SPS or grant-free resource region that is overlapped with the new BWP is valid in the new BWP and perform data transmission or reception in the corresponding resources without receipt of a separate DCI.

If it is determined at step 1406 that the previously configured SPS or grant-free resource region is not overlapped (or overlapped at least in part) with the new BWP, the UE may determine at step 1410 that the SPS or grant-free resource region is invalid in the new BWP and may not perform data transmission or reception using the corresponding resources without receipt of a separate DCI.

Figure 15:
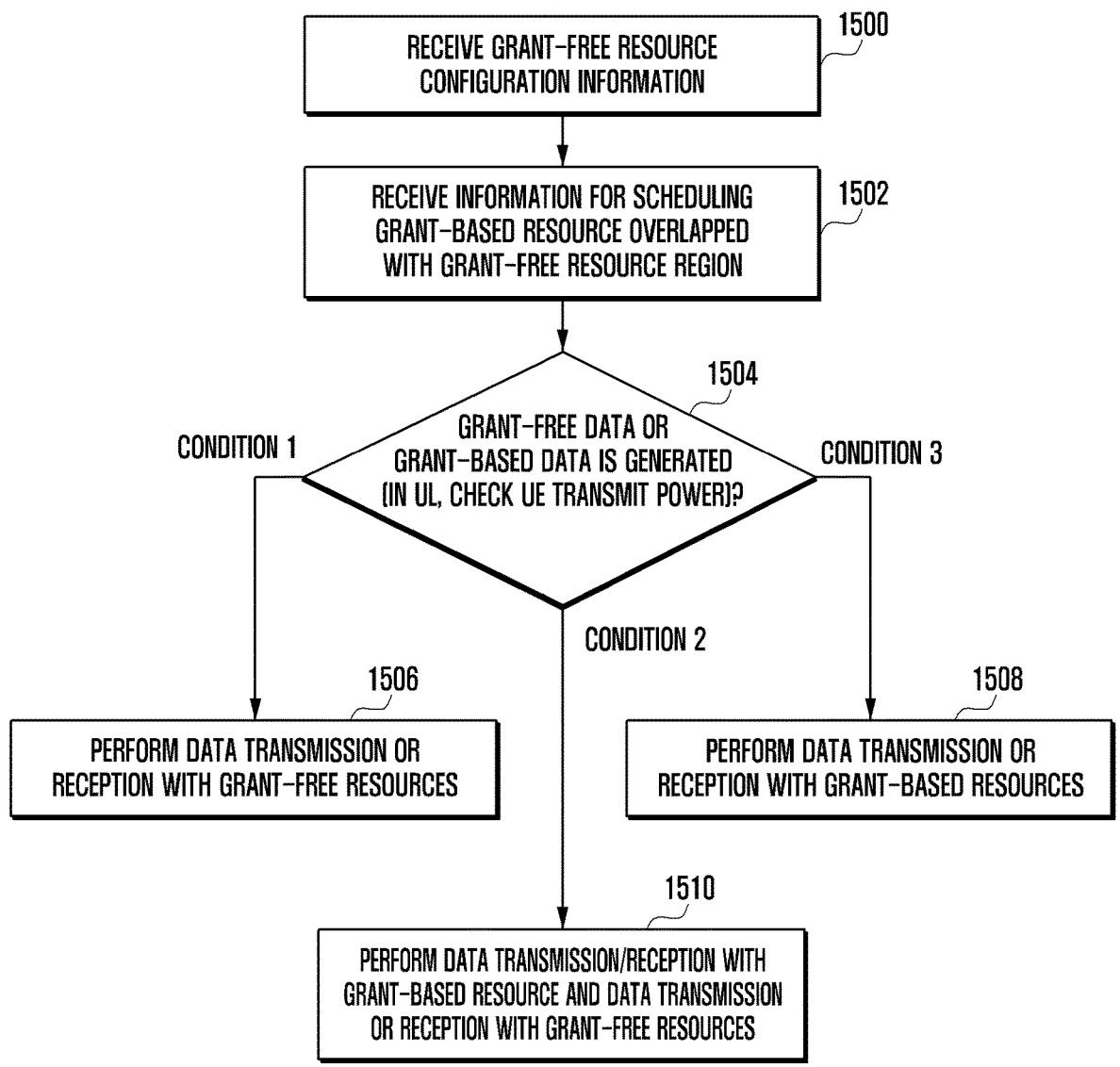
FIG. 15 is a flowchart of a grant-free and grant-based resource utilization method of a UE, according to an embodiment.

FIG. 15 is a flowchart of a grant-free and grant-based resource utilization method of a UE, according to an embodiment.

Referring to FIG. 15, at step 1500, the UE may receive SPS or grant-free resource configuration information via UE-specific (or common) higher layer signaling or L1 signaling. The SPS or grant-free resource configuration information may be used for configuring periodically assigned resource regions for use by the UE in transmitting or receiving data without receipt of a separate DCI.

At step 1502, the UE may ascertain that the scheduled UL grant or DL grant-based resource region is overlapped with the SPS or grant-free resource region through DCI search. It may be possible to consider together the case where the UL grant or DL grant-based resource region is overlapped in part with the SPS or grant-free resource region.

When both the grant-based and grant-free resource regions are UL resource regions, the UE may take a different operation according to the result of determination made at step 1504 on presence/absence of data to be transmitted in the respective resource regions and uplink transmit power.

If condition 1 is fulfilled, the UE performs data transmission only in the UL grant-free resource region at step 1506. Condition 1 may be one or a combination of the following conditions:
1. Only the UL grant-free data occurs;
2. Both the UL grant-free data and grant-based data occur, and the priority of the UL grant-free data is higher than that of the UL grant-based data;
3. The transmit power is insufficient for transmitting both the UL grant-free data and grant-based data; and/or
4. The above condition information is received via higher layer signaling or L1 signaling.

If condition 2 is fulfilled, the UE performs data transmission in the grant-based and grant-free resource regions at step 1510. The UE may perform data transmission in the grant-based resource region with the exclusion of the grant-free resource region through rate matching and punctured data mapping. Condition 2 may be one or a combination of the following conditions:
1. Both the UL grant-free and UL grant-based data occur;
2. The transit power is sufficient for transmitting both the UL grant-free and UL grant-based data; and/or
3. The above condition information is received via higher layer signaling or L1 signaling.

If condition 3 is fulfilled, the UE performs data transmission only in the grant-based resource region at step 1508. The UE may perform data transmission in the grant-based resource region with the exclusion of the grant-free resource region through rate matching and punctured data mapping. It may also be possible to perform data transmission in the grant-based resource region with the inclusion of the grant-free resource region through rate matching and punctured data mapping. How to select one of the above methods may be configured or indicated separately via higher layer signaling or L1 signaling, Condition may be one or a combination of the following conditions:

1. Only UL grant-based data occur;
2. Both the UL grant-free and UL grant-based data occur, and the priorities of the UL grant-free and UL grant-based data are similar to each other;
3. The transmit power is not sufficient for transmitting both the UL grant-free and UL grant-based data; and/or
4. The above condition information is received via higher layer signaling or L1 signaling.

When both the grant-based and grant-free resource regions are DL resource regions, the UE may take a different operation according to the result of determination made at step 1504 on presence/absence of data to be transmitted in the respective resource regions and downlink transmit power.

If condition 1 is fulfilled, the UE performs data transmission only in the DL grant-free resource region at step 1506. Condition 1 may be one or a combination of the following conditions:

1. Only the DL grant-free data occurs;
2. Both the DL grant-free data and grant-based data occur, and HARQ process indices are insufficient;
3. Both the DL grant-free data and grant-based data occur, and soft buffers of he UE are insufficient; and/or
4. The above condition information is received via higher layer signaling or Li signaling.

If condition 2 is fulfilled, the UE performs data transmission in the DL grant-based resource region and data reception in the DL grant-free resource region at step 1510. The UE may perform data reception in the DL grant-based resource region with the exclusion of the DL grant-free resource region through rate matching and punctured data mapping. Condition 2 may be one or a combination of the following conditions:

1. Both the DL grant-free and DL grant-based data occur;
2. The DCI for scheduling DL grant-based data indicates that the DL grant-based data is mapped with the exclusion of the previously configured grant-free resource region; and/or
3. The above condition information is received via higher layer signaling or L1 signaling.

If condition 3 is fulfilled, the UE performs data reception only in the grant-based resource region at step 1508. The UE may perform data reception in the grant-based resource region with the exclusion of the grant-free resource region through rate matching and punctured data mapping. It may also be possible to perform data reception in the grant-based resource region with the inclusion of the grant-free resource region through rate matching and punctured data mapping. How to select one of the above methods may be configured or indicated separately via higher layer signaling or L1 signaling. Condition 3 may be one or a combination of the following conditions;

1. Only DL grant-based data occur;
2. The DCI for scheduling DL grant-based data indicates that the DL grant-based data is mapped with the inclusion of the previously configured grant-free resource region; and/or
3. The above condition information is received via higher layer signaling or L1 signaling.

Figure 16:
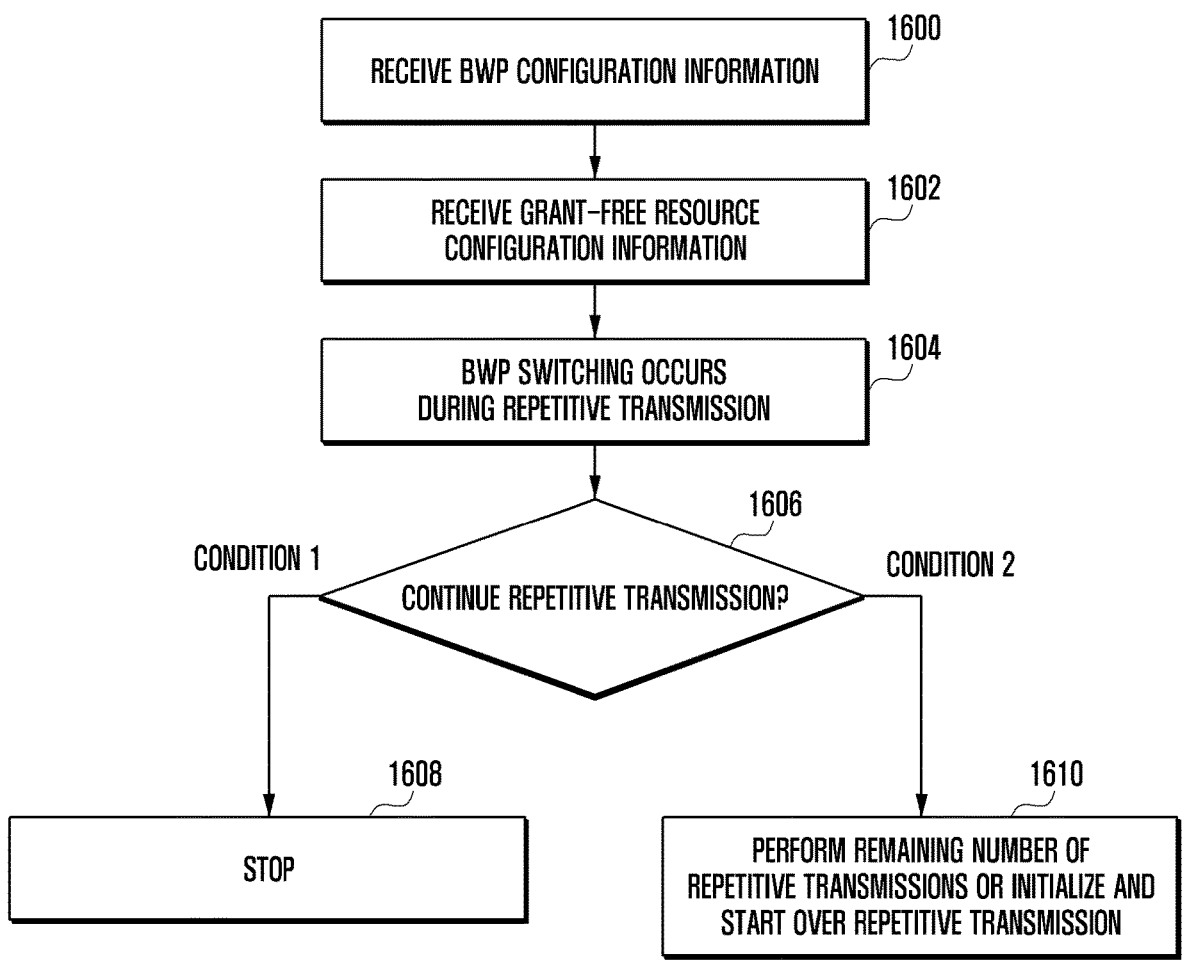
FIG. 16 is a flowchart of an SPS or grant-free resource-based repetitive transmission procedure of a UE in a BWP switching situation, according to an embodiment.

FIG. 16 is a flowchart of a SPS or grant-free resource-based repetitive transmission procedure of a UE in a BWP switching situation, according to an embodiment.

Referring to FIG. 16, at step 1600, the UE may receive BWP candidate configuration information via UE-specific higher layer signaling or common higher layer signaling.

At step 1602, the UE may receive SPS or grant-free resource configuration information. The BWP candidate configuration information and the SPS or grant-free resource configuration information may be received commonly or separately via higher layer signaling or L1 signaling. The BWP for use by the UE in data transmission or reception, among the BWP candidates, may be configured or indicated via higher layer signaling or L1 signaling. It may be possible that the UE perform SPS or grant-free data transmission or reception in the SPS or grant-free resource region overlapped with the BWP (in whole or at least in part). The UE may also perform repetitive transmission (or reception) in the SPS or grant-free resource regions based on the maximum number of repetitive transmissions (or receptions) that is configured via L1 signaling or higher layer signaling.

At step 1604, the UE may receive information indicating BWP switching via higher layer signaling or L1 signaling in the course of performing repetitive data transmission or reception based on the maximum number of repetitive transmissions (or receptions) configured previously.

At step 1606, the UE may determine whether to continue the repetitive transmission in the switched BWP.

If condition 1 is fulfilled, the UE may stop the repetitive transmission at step 1608. Condition 1 may be one or a combination of the following conditions:

1. BWP switching occurs;
2. The new BWP is not overlapped with the SPS or grant-free resource region configured in the old BWP (in whole or at least part);
3. The number of the repetitive transmissions is equal to or greater than a predetermined threshold value in the switched BWP;
4. The switched BWP has no SPS (or grant-free resource) region;
5. The condition 1 is received via higher layer signaling or L1 signaling; and/or
6. The SPS or grant-free resource configuration in the switched BWP and the SPS or grant-free resource configuration (e.g., transmission interval, frequency resource allocation information, time allocation information, MCS value, TBS value, RV value, DMRS configuration information, and offset value) for use in the repetitive transmission are different in whole or at least in part from each other.

If condition 2 is fulfilled, the UE may perform the remaining repetitive transmissions, initialize the number of repetitive transmission and then start over the repetitive transmissions again in the switched BWP, or continue the repetitive transmission based on the number of repetitive transmission that is configured for the switched BWP. Condition 2 may be one or a combination of the following conditions:

1. The new BWP is overlapped with the SPS or grant-free resource region configured in the old BWP (in whole or at least in part);
2. The new BWP has configured SPS or grant-free resource region;
3. The condition 2 is received via higher layer signaling or L1 signaling; and/or
4. The SPS or grant-free resource configuration in the switched BWP and the SPS or grant-free resource configuration (e.g., transmission interval, frequency resource allocation information, time allocation information, MCS value, TBS value, RV value, DMRS configuration information, and offset value) for use in the repetitive transmission are identical in whole or at least in part with each other.

Figure 17:
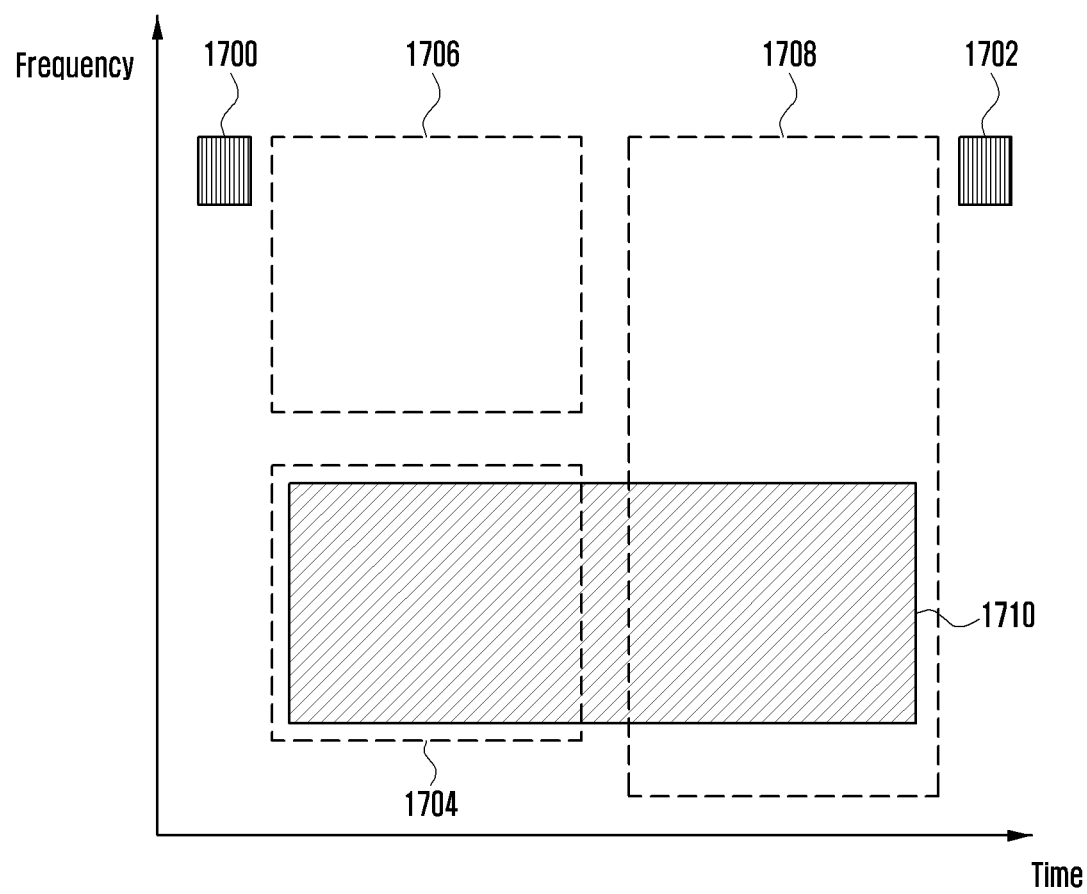
FIG. 17 is a diagram of an interruption indicator and relationship between interruption-available resource regions and BWPs, according to an embodiment.

FIG. 17 is a diagram of an interruption indicator and relationship between interruption-available resource regions and BWPs, according to an embodiment.

The term interruption may refer to a situation where at least part of a resource region scheduled for data transmission of a first service (e.g., eMBB) UE is actually used for data transmission of a second service (e.g., URLLC) UE. Because the first service UE attempts to receive data under the assumption that its service data are mapped to the whole resource region scheduled therefor if there is no separate information indicating such a situation, the interruption in itself causes performance degradation of the first service UE.

Referring to FIG. 17, an interruption indicator is transmitted at a predetermined interval in a downlink control region preconfigured via higher layer signaling as denoted by reference number 1700 and 1702. The interruption indicator may be transmitted over a common control channel or UE-specific control channel. The UE may perform blind decoding to detect the interruption information as part of DCI including a cyclic redundancy check (CRC) scrambled with a specific RNTI. The time period of the resource region 1710 indicatable by the interruption indicator 1702 may be equal to or longer or shorter than the interruption indicator transmission interval (i.e., time length between the resource log actions 1700 and 1702. It is assumed that the time period of the interruption-available resource region 1710 is equal to the interval of the interruption indicator.

It may be possible to configure BWP candidates via common or UE-specific higher layer signaling in advance and then BWPs for actual use in transmitting or receiving data via UE-specific higher layer signaling or L1 signaling. The UE may be configured with BWP candidates 1704, 1706, and 1708. The interruption indicator search may be performed differently depending on the BWP selected for actual data transmission or reception among the BWP candidates.

There is no possibility that interruption occurs in the BWP 1706 configured to the UE because the BWP 1706 is not overlapped with the interruption-available resource region 1710 indicatable by the interruption indicator, In the case, it may be possible that the UE skips searching the previously configured downlink control channel 1702 for the interruption indicator providing the UE with the interruption information about the resource region 1710. There is a possibility that interruption occurs in the BWPs 1704 ad 1708 configured to the UE because the BWPs 1704 and 1708 are overlapped with the interruption-available resource region 1710 indicatable by the interruption indicator. In this case, it may be possible that the UE searches the previously configured downlink control channel 1702 for the interruption indicator providing the UE with the interruption information about the resource region 1710. It may also be possible that the UE searches the previously configured downlink control channel 1702 for the interruption indicator providing the UE with the interruption information associated with the resource region 1710 only when the downlink (or uplink) data transmission is scheduled in the BWP 1704 or 1708.

Although not shown in FIG. 17, the downlink control channel 1702 configured previously for searching for the interruption indicator carrying the interruption information may be located in the BWP 1704, 1706, or 1708, or the like. The downlink channel carrying the interruption indicator may be a common control channel or a UE-specific control channel.

FIG. 18 is a diagram of a method for configuring grant-free or SPS resources in adaptation to BWP configuration, according to an embodiment.

Referring to FIG. 18, the UE may be configured with the BWP candidates in advance via UE-specific or common higher layer signaling. At least one of the BWP candidates is configured as active BWP via UE-specific higher layer signaling or L1 signaling for actual UL or DL data transmission. FIG. 18 depicts a situation where the active BWP of a UE is switched sequentially, as time goes, in the order: BWP 1800, BWP 1801, BWP 1802, and BWP 1803.

It may be possible to configure a UE with grant-free or SPS resources in such a way of transmitting the allocation interval of the corresponding resources via UE-specific higher layer signaling and the remaining resource configuration information (e.g., frequency resources, time resources, L1 signaling timing-based offset, MCS, RV, and HARQ process index) via L1 signaling. It may also be possible for the UE to the remaining resource configuration information via UE-specific L1 signaling in the BWP 1800 in a situation where it has received the configuration information of the grant-free or SPS resources allocation interval via UE-specific higher layer signaling.

FIG. 18 shows a situation where the grant-free or SPS resource regions 1804 and 1805 have been configured via UE-specific L1 signaling, This may mean that the grant-free or SPS resource regions 1804 and 1805 are activated via L1 signaling. The UE may perform data transmission or reception in the resource regions 1804 and 1805 without any separate scheduling information via DCI.

When BWP switching from the BWP 1800 to the BWP 1801 is indicated via UE-specific L1 signaling or higher layer signaling, it may be possible that the UE assumes that the grant-free or SPS resource regions 1804 and 1805 configured in the BWP 1800 are invalid in the BWP 1801 without any separate L1 signaling for indicating release/deactivation of the corresponding resource regions. If the BWP switching is performed back to the BWP (e.g., BWP 1802) similar to the BWP 1800 afterward, the corresponding grant-free or SPS resources 1804 and 1805 (i.e., grant-free or SPS resources 1806 and 1807) may become valid.

When BWP switching from the BWP 1800 to the BWP 1801 is indicated via UE-specific L1 signaling or higher layer signaling, it may be possible that the UE assumes that the grant-free or SPS resource regions 1804 and 1805 configured in the BWP 1800 are invalid in all BWPs including the BWP 1801 that are configured since then without any separate L1 signaling for indicating release/deactivation of the corresponding resource regions. In this case, although the BWP switching is performed back to the BWP (e.g., BWP 1802) similar to the BWP 1800 afterward, the corresponding grant-free or SPS resources 1804 and 1805 (i.e., grant-free or SPS resources 1806 and 1807) are still valid and may become valid upon receipt of separate indication via L1 signaling.

When BWP switching from the BWP 1800 to the BWP 1801 is indicated via UE-specific L1 signaling or higher layer signaling, it may be possible to release or deactivate the grant-free or SPS resource regions 1804 and 1805 configured in the BWP 1800 in a timer-based manner without any separate L1 signaling for indicating release/deactivation of the corresponding resource regions. In this case, the timer information for release/deactivation of the corresponding grant-free or SPS resource regions may be included in the UE-specific L1 signaling or higher layer signaling for configuring the grant-free or SPS resource regions. The timer information may be the information for use in determining the validity of the corresponding grant-free or SPS resource regions, which are valid only in the BWP in which data transmission or reception is actually performed.

FIG. 18 also shows a situation where grant-free or SPS resource regions 1808 and 1809 are configured in the BWP 1801 via UE-specific L1 signaling. The UE may perform data transmission or reception in the grant-free or SPS resource regions 1808 and 1809 without receipt of separate scheduling information via DCI.

When BWP switching from the BWP 1801 to the BWP is indicated via UE-specific L1 signaling or higher layer signaling, it may be possible that the UE assumes that the grant-free or SPS resource regions 1808 and 1809 configured in the BWP 1801 are invalid in the BWP 1802 without any separate L1 signaling for indicating release/deactivation of the corresponding resource regions, Here, the BWP 1802 may be identical with the BWP 1800 in frequency band location and bandwidth.

When the BWP 1800 and BWP 1802 are identical with each other in frequency band location and bandwidth, the resource regions 1806 and 1807 configured in the BWP 1802 may be used for the data transmission ore reception as in the grant-free or SPS resource regions 1804 and 1805 configured in the BWP 1800 unless there is a separate L1 signaling indicative of release/deactivation of the corresponding resources. The resource regions 1806 and 1807 and the resource regions 1804 and 1805 are configured and/or activated together as indicated via L1 signaling, different in time, identical in frequency, offset, and interval, and share common resource configuration information for SPS or grant-free data transmission that is configured via L1 signaling.

If BWP switching from the BWP 1802 to the BWP 1801 is indicated via a UE-specific L1 signaling or higher layer signaling, it may be possible that the grant-free or SPS resource regions 1806 and 1807 are invalid any long in the BWP 1803 without any L1 signaling indicative of release/deactivation of the corresponding resource regions.

The BWP 1803 may be identical with the BWP 1801 in frequency band location and bandwidth. In the case where the BWP 1801 and BWP 1803 are identical with each other in frequency band location and bandwidth, the resource regions 1810 and 1811 configured in the BWP 1803 may be used for the data transmission or reception as in the grant-free or SPS resource regions 1808 and 1809 configured in the BWP 1801 unless there is a separate L1 signaling indicative of release/deactivation of the corresponding resources. The resource regions 1810 and 1811 and the resource regions 1808 and 1809 are simultaneously activated as indicated via L1 signaling and different in time, and identical in frequency, offset, and interval, and share common resource configuration information for SPS or grant-free data transmission that is configured via L1 signaling.

Alternatively, it may be possible to indicate the SPS or grant-free resource regions configuration separately regardless of BWP switching. It may be possible that the UE assumes the validity of the SPS or grant-free resource configuration indicated via UE-specific L1 signaling or higher layer signaling in the BWP overlapped at least in part (or in whole) with the corresponding resource regions in frequency until any separate L1 signaling indicative of release/deactivation of the corresponding resource regions. BWPs 1820, 1821, 1822, and 1823 are configured in sequential order in time, and SPS or grant-free resource regions 1824 and 1825 are configured in the BWP 1820 via UE-specific signaling or higher layer signaling.

If the SPS or grant-free resource regions 1824 and 1825 are included in all of the BWP 1820, BWP 1821, and BWP 1822 regardless of BWP switching from the BWP 1820 to the BWP 1821 to BWP 182, it may be possible that the validity of the corresponding resource regions is maintained without any separate L1 signaling indicative of release/deactivation of the corresponding resource regions before configuration of the BWP 1823. FIG. 18 shows that the SPS or grant-free resource regions 1824 and 1825 becomes, if the release/deactivation of the corresponding resource regions is indicated via separate L1 signaling before the configuration of the BWP 1823, invalid in the BWP 1823.

The SPS or grant-free resource regions 1824, 1825, 1826, 1827, 1828, and 1829 are all configured and/or activated together as indicated via L1 signaling, different in time, identical in frequency, offset, and interval, and share common resource configuration information for SPS or grant-free data transmission that is configured via L1 signaling. It may also be possible to configure SPS or grant-free resource regions 1830 and 1831 in addition to the SPS or grant-free resource regions 1826 and 1827 in the BWP 1821 via extra UE-specific L1 signaling or higher layer signaling. In the case where bandwidth switching from the BWP 1821 to the BWP 1822 is performed, it may be possible that the UE cannot use the SPS or grant-free resource regions 1830 and 1831 temporarily (at least in the BWP 1822) because the BWP 1822 differs from the BWP 1821 in frequency resource information (or band), although the corresponding resource regions are not released/deactivated. When BWP switching from the BWP 1822 to the BWP 1823 is performed, it may occur that the SPS or grant-free resources 1834 and 1835 are overlapped at least in part with the BWP 1823 in frequency. In this case, it may be possible that the UE determines that the SPS or grant-free resource regions 1834 and 1835 are invalid. It may also be possible that the UE determines that only the parts of the SPS or grant-free resource regions 1834 and 1835 that are overlapped with the BWP 1823 are valid. It may also be possible that the UE determines that all of the SPS or grant-free resource regions 1834 and 1835 are valid even though the SPS or grant-free resource regions 1834 and 1835 are overlapped in part with the BWP 1823.

Alternatively, when all of the SPS or grant-free resource configuration information is transmitted via UE-specific higher layer signaling, it may be possible that the UE performs data transmission or reception in the corresponding SPS or grant-free resource regions without any activation/deactivation/release indication via separate L1 signaling. The configuration information being transmitted via UE-specific higher layer signaling may include at least one of resource interval, offset, time resource allocation information, frequency resource allocation information, DMRS configuration information, MCS value, TBS value, number of repetitive transmission, and UE's transmit power value (in case of uplink transmission). It may be possible that the UE determines that the SPS or grant-free resource regions that are (in whole or at least in part) included in the BWP configured via L1 signaling or higher layer signaling among the configured SPS or grant-free resource regions. In a situation where BWP switching is performed sequentially in the order: BWP 1850, BWP 1851, BWP 1852, and BWP 1853, it may be possible to determine that the SPS or grant-free resource regions 1854, 1855, 1856, 1857, 1858, 1859, 1860, 1861, 1864, and 1865 that are wholly included in the corresponding BWPs as valid resource regions among the SPS or grant free resource regions 1854, 1855, 1856, 1857, 1858, 1859, 1860, 1861, 1862, 1863, 1864, 1865, 1866, 1867, 1868, and 1869. It may also be possible to determine that the SPS or grant-free resource regions 1854, 1855, 1856, 1857, 1858, 1859, 1860, 1861, 1864, 1865, 1868, and 1869 that are at least partly included in the corresponding BWPs as valid resource regions among the SPS or grant-free resource regions 1854, 1855, 1856, 1857, 1858, 1859, 1860, 1861, 1862, 1863, 1864, 1865, 1866, 1867, 1868, and 1869. Here, the UE may use only the overlapped parts or all of the SPS or grant-free resource regions 1868 and 1869 overlapped with the BWP 1853 for SPS or grant-free transmission or reception.

The L1 signal for indicating release/deactivation of the previously configured SPS or grant-free resource region may be transmitted to the UE anytime, regardless of whether the SPS or grant-free resource region is overlapped with a BWP. The SPS or grant-free resource regions 1832 and 1833 that are invalid in the BWP 1822 (or resources not scheduled for data transmission in the BWP 1822 via DCI) may be deactivated/released via L1 signaling.

If certain resources are valid, this means that the UE can may use the corresponding resources for data transmission or reception.

Figure 19:
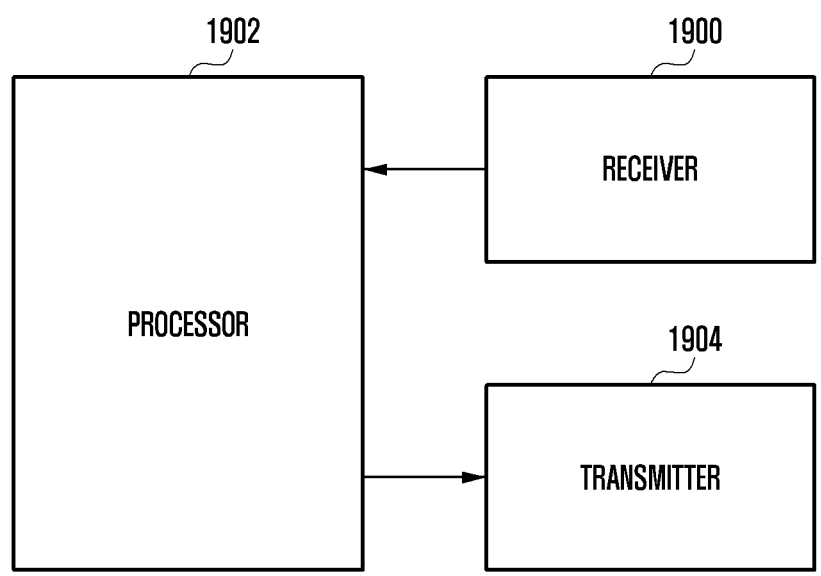
FIG. 19 is a diagram of a configuration of a UE, according to an embodiment.

FIG. 19 is a diagram of a configuration of a UE, according to an embodiment. Referring to FIG. 19, the UE may include a receiver 1900, a transmitter 1904, and a processor 1902. The receiver 1900 and the transmitter 1904 may be collectively referred to as transceiver. The transceiver may transmit and receive signals to and from a base station. The signals may include control information and data. The transceiver may include a radio frequency (RF) transmitter for frequency-up-converting and amplifying a signal to be transmitted and an RF receiver for low-noise-amplifying and frequency-down-converting a received signal. The transceiver may output the signal received over a radio channel to the processor 1902 and transmit the signal output from the processor 1902 over the radio channel. The processor 1902 may control the overall operation of the UE. The processor 1902 may control the receiver 1900 to receive a signal carrying a second signal transmission timing information and decode the single to ascertain the second signal transmission timing. The processor 1902 may control the transmitter 1904 to transmit the second signal at the ascertained timing. The processor 1902 may control the receiver 1900 to receive SPS or grant-free resource configuration and BWP configuration signals from the base station and decode the SPS or grant-free resource configuration and BWP configuration signals. Afterward, the processor 1902 may control the transmitter 1904 to transmit data in the resource regions configured based on the information ascertained from the SPS or grant-free resource configuration and BWP configuration signals.

Figure 20:
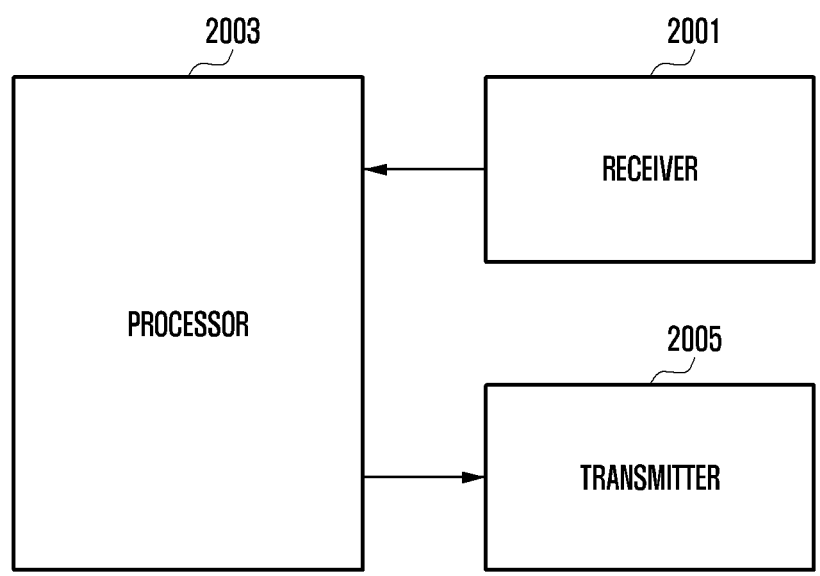
FIG. 20 is a diagram of a configuration of a base station, according to an embodiment.

FIG. 20 is a diagram of a configuration of a base station, according to an embodiment.

Referring to FIG. 20, the base station may include at least one of a receiver 2001 a transmitter 2005, and a processor 2003. The receiver 2001 and the transmitter 2005 may be collectively referred to as transceiver. The transceiver may transmit and receive signals to and from a UE. The signals may include control information and data. The transceiver may include a RF transmitter for frequency-up-converting and amplifying a signal to be transmitted and an RF receiver for low-noise-amplifying and frequency-down-converting a received signal. The transceiver may output the signal received over a radio channel to the processor 2003 and transmit the signal output from the processor 2003 over the radio channel. The processor 2003 may control overall operations of the base station according to an embodiment of the present disclosure. The processor 2003 may determine a second signal transmission timing and generate a second signal transmission timing information. The processor 2003 may control the transmitter 2005 to transmit the second signal transmission timing information to the UE and control the receiver 2001 to receive the second signal at the corresponding timing. The processor 2003 may control to generate DCI including the second signal transmission timing information. In this case, the DCI may indicate inclusion of the second signal transmission timing information. The processor 2003 may control to determine SPS or grant-free resource configuration and BWP configuration and generate SPS or grant-free resource configuration and BWP configuration information. The processor 2003 may also control the transmitter 2005 to transmit the SPS or grant-free resource configuration and BWP configuration information to the UE and control the receiver 2001 to receive data in the SPS or grant-free resource regions. The processor 2003 may control to generate DCI or higher layer signal (e.g., RRC signal) including SPS or grant-free resource configuration and BWP configuration information. In this case, the DCI or the RRC signal may indicate inclusion of the SPS or grant-free resource configuration and BWP configuration information.

As described above, the present disclosure is advantageous in terms of providing a SRS or grant-free resource configuration information-based data communication method and apparatus.

Also, the present disclosure is advantageous in terms of providing a data communication method and apparatus that is capable of transmitting/receiving data using grant-free resources configured per bandwidth part.

Also, the present disclosure is advantageous in terms of providing a data communication method and apparatus that is capable of transmitting/receiving data using grant-free resources configured per bandwidth part in a system supporting bandwidth part switching.

Also, the present disclosure is advantageous in terms of allowing a terminal to perform channel estimation with DMRSs time-bundled adaptively in consideration of multiple scheduling-related parameters and demodulation/decoding on the transmission blocks scheduled in multiple slots based on the estimation result.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™), In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a base station in a wireless communication system, the method comprising:
    transmitting, to a user equipment (UE), via UE specific higher layer signaling, configuration information for defining a downlink assignment for a semi-persistent scheduling associated with a bandwidth part (BWP), wherein the configuration information defining the downlink assignment for the semi-persistent scheduling is configured within a BWP configuration;
    transmitting downlink control information (DCI);
    identifying the BWP as an activated BWP; and
    transmitting data to the UE on the activated BWP based on the downlink assignment for the semi-persistent scheduling associated with the BWP,
    wherein the downlink assignment is defined on the activated downlink BWP, a part for defining the downlink assignment for the semi-persistent scheduling is based on the configuration information transmitted by the higher layer signaling and another part for defining the downlink assignment for the semi-persistent scheduling is based on information transmitted by the DCI, and
    wherein the configuration information transmitted by the higher layer signaling comprises interval information for the downlink assignment for the semi-persistent scheduling, and the information transmitted by the DCI comprises a frequency domain resource allocation, a time domain resource allocation, and a modulation and coding scheme (MCS) for the downlink assignment for the semi-persistent scheduling.

2. The method of claim 1, wherein:
    the DCI defining the downlink assignment includes a cyclic redundancy check (CRC) scrambled by a specific radio network temporary identifier (RNTI); and
    the specific RNTI is transmitted by the higher layer signaling.

3. The method of claim 1, wherein the downlink assignment is deactivated in response to the activated BWP being deactivated.

4. A method performed by a user equipment (UE) in a wireless communication system, the method comprising:
    receiving, from a base station, via UE specific higher layer signaling, configuration information for defining a downlink assignment for a semi-persistent scheduling associated with a bandwidth part (BWP), wherein the configuration information defining the downlink assignment for the semi-persistent scheduling is configured within a BWP configuration;
    receiving downlink control information (DCI);
    identifying the BWP as an activated BWP, by the DCI; and
    receiving data from the base station on the activated BWP based on the downlink assignment for the semi-persistent scheduling associated with the BWP,
    wherein the downlink assignment is defined on the activated downlink BWP, a part for defining the downlink assignment for the semi-persistent scheduling is based on the configuration information received by the higher layer signaling and another part for defining the downlink assignment for the semi-persistent scheduling is based on information received by the DCI, and
    wherein the configuration information received by the higher layer signaling comprises interval information for the downlink assignment for the semi-persistent scheduling, and the information received by the DCI comprises a frequency domain resource allocation, a time domain resource allocation, and a modulation and coding scheme (MCS) for the downlink assignment for the semi-persistent scheduling.

5. The method of claim 4, wherein:
    the DCI defining the downlink assignment includes a cyclic redundancy check (CRC) scrambled by a specific radio network temporary identifier (RNTI); and
    the specific RNTI is received by the higher layer signaling.

6. The method of claim 4, wherein the downlink assignment is deactivated in response to the activated BWP being deactivated.

7. A base station in a wireless communication system, the base station comprising:
    a transceiver; and
    a controller configured to:
        transmit, to a user equipment (UE), via UE specific higher layer signaling, configuration information for defining a downlink assignment for a semi-persistent scheduling associated with a bandwidth part (BWP), wherein the configuration information defining the downlink assignment for the semi-persistent scheduling is configured within a BWP configuration;
        transmit downlink control information (DCI);
        identify the BWP as an activated BWP; and
        transmit data to the UE on the activated BWP based on the downlink assignment for the semi-persistent scheduling associated with the BWP,
        wherein the downlink assignment is defined on the activated downlink BWP, a part for defining the downlink assignment for the semi-persistent scheduling is based on the configuration information transmitted by the higher layer signaling and another part for defining the downlink assignment for the semi-persistent scheduling is based on information transmitted by the DCI, and wherein the configuration information transmitted by the higher layer signaling comprises interval information for the downlink assignment for the semi-persistent scheduling, and the information transmitted by the DCI comprises a frequency domain resource allocation, a time domain resource allocation, and a modulation and coding scheme (MCS) for the downlink assignment for the semi-persistent scheduling.

8. The base station of claim 7, wherein:

the DCI defining the downlink assignment includes a cyclic redundancy check (CRC) scrambled by a specific radio network temporary identifier (RNTI); and the specific RNTI is transmitted by the higher layer signaling.

9. The base station of claim 7, wherein the downlink assignment is deactivated in response to the activated BWP being deactivated.

10. A user equipment (UE) in a wireless communication system, the UE comprising:

a transceiver; and a controller configured to:

receive, from a base station, via UE specific higher layer signaling, configuration information for defining a downlink assignment for a semi-persistent scheduling associated with a bandwidth part (BWP), wherein the configuration information defining the downlink assignment for the semi-persistent scheduling is configured within a BWP configuration;

receive downlink control information (DCI);

identify the BWP as an activated BWP, by the DCI; and receive data from the base station on the activated BWP based on the downlink assignment for the semi-persistent scheduling associated with the BWP, wherein the downlink assignment is defined on the activated downlink BWP, a part for defining the downlink assignment for the semi-persistent scheduling is based on the configuration information received by the higher layer signaling and another part for defining the downlink assignment for the semi-persistent scheduling is based on information received by the DCI, and wherein the configuration information received by the higher layer signaling comprises interval information for the downlink assignment for the semi-persistent scheduling, and the information received by the DCI comprises a frequency domain resource allocation, a time domain resource allocation, and a modulation and coding scheme (MCS) for the downlink assignment for the semi-persistent scheduling.

11. The UE of claim 10, wherein:

the DCI defining the downlink assignment includes a cyclic redundancy check (CRC) scrambled by a specific radio network temporary identifier (RNTI); and the specific RNTI is received by the higher layer signaling.

12. The UE of claim 10, wherein the downlink assignment is deactivated in response to the activated BWP being deactivated.

* * * * *